(12) United States Patent  
Tamatsu et al.

(10) Patent No.: US 9,168,867 B2
(45) Date of Patent: Oct. 27, 2015

(54) PEDESTRIAN NOTIFICATION APPARATUS

(71) Applicant: DENSO CORPORATION, Kariya, Aichi-pref. (JP)

(72) Inventors: Yukimasa Tamatsu, Okazaki (JP); Shouichirou Hanai, Anjo (JP); Aki Nagatomo, Kariya (JP); Hiroaki Ohshima, Nagoya (JP); Akihito Tanahashi, Gifu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 210 days.

(21) Appl. No.: 14/014,696

(22) Filed: Aug. 30, 2013

(65) Prior Publication Data

US 2014/0062685 A1 Mar. 6, 2014

(30) Foreign Application Priority Data

Aug. 31, 2012 (JP) ................................. 2012-191928

(51) Int. Cl.
*B60Q 1/00* (2006.01)
*B60Q 5/00* (2006.01)
*B60Q 1/50* (2006.01)
*G08G 1/005* (2006.01)
*G08G 1/16* (2006.01)

(52) U.S. Cl.
CPC ........ *B60Q 5/005* (2013.01); *B60Q 1/50* (2013.01); *G08G 1/005* (2013.01); *G08G 1/163* (2013.01); *B60Q 2400/50* (2013.01)

(58) Field of Classification Search
CPC .............. B60Q 1/12; B60Q 1/08; B60Q 1/04; B60Q 1/442; B60Q 5/005; G06K 9/00791; G02B 27/01; H04N 7/18

USPC .............. 340/425.5, 905, 925, 944, 903, 435
See application file for complete search history.

(56) References Cited

U.S. PATENT DOCUMENTS

2006/0114125 A1* 6/2006 Kubota et al. ................. 340/905
2007/0008096 A1* 1/2007 Tracy ............................. 340/476
2010/0253595 A1* 10/2010 Szczerba et al. ................... 345/7
2013/0003403 A1* 1/2013 Takahira et al. .............. 362/538

(Continued)

FOREIGN PATENT DOCUMENTS

JP     11-139229     5/1999
JP     2002-092781   3/2002

(Continued)

OTHER PUBLICATIONS

Office action dated Jun. 23, 2014 in corresponding Korean Application No. 10-2013-0102314.

(Continued)

*Primary Examiner* — Brent Swarthout
(74) *Attorney, Agent, or Firm* — Harness, Dickey & Pierce, P.L.C.

(57) ABSTRACT

A pedestrian notification apparatus, which is configured to be used in a vehicle, includes an ambient object detector, a notification target detector and a notifier. The ambient object detector is configured to detect ambient objects present around the vehicle. The notification target detector is configured to detect a notification target pedestrian based on the detection results of the ambient object detector. The notifier is configured to notify the notification target pedestrian that the notification target pedestrian has been detected by the notification target detector.

6 Claims, 18 Drawing Sheets

(56) References Cited

U.S. PATENT DOCUMENTS

| | | |
|---|---|---|
| 2013/0154815 A1* | 6/2013 | Min et al. .................... 340/425.5 |
| 2014/0035740 A1* | 2/2014 | Lettstrom et al. ............. 340/479 |
| 2014/0240118 A1* | 8/2014 | Lee ............................... 340/463 |

FOREIGN PATENT DOCUMENTS

| | | |
|---|---|---|
| JP | 2004-331021 | 11/2004 |
| JP | 2005-047455 | 2/2005 |
| JP | 2008-143505 | 6/2008 |
| JP | 2011-079349 | 4/2011 |
| JP | 2012-048591 | 3/2012 |
| KR | 2009-0126586 | 12/2009 |

OTHER PUBLICATIONS

Office Action dated Jun. 24, 2014 in corresponding Japanese Application No. 2012-191928.

* cited by examiner

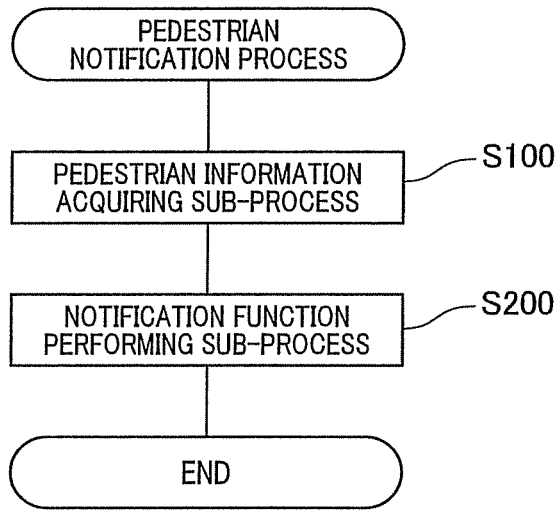
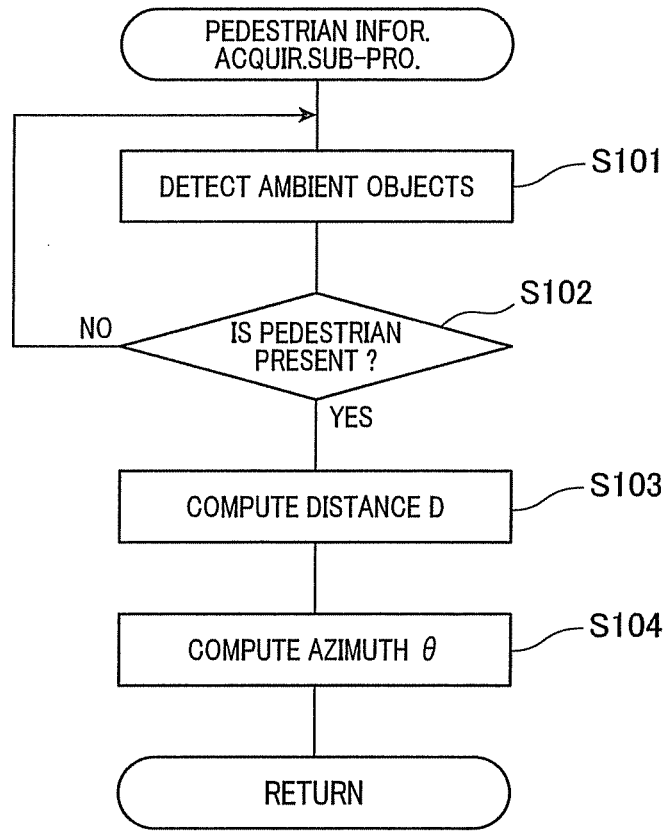

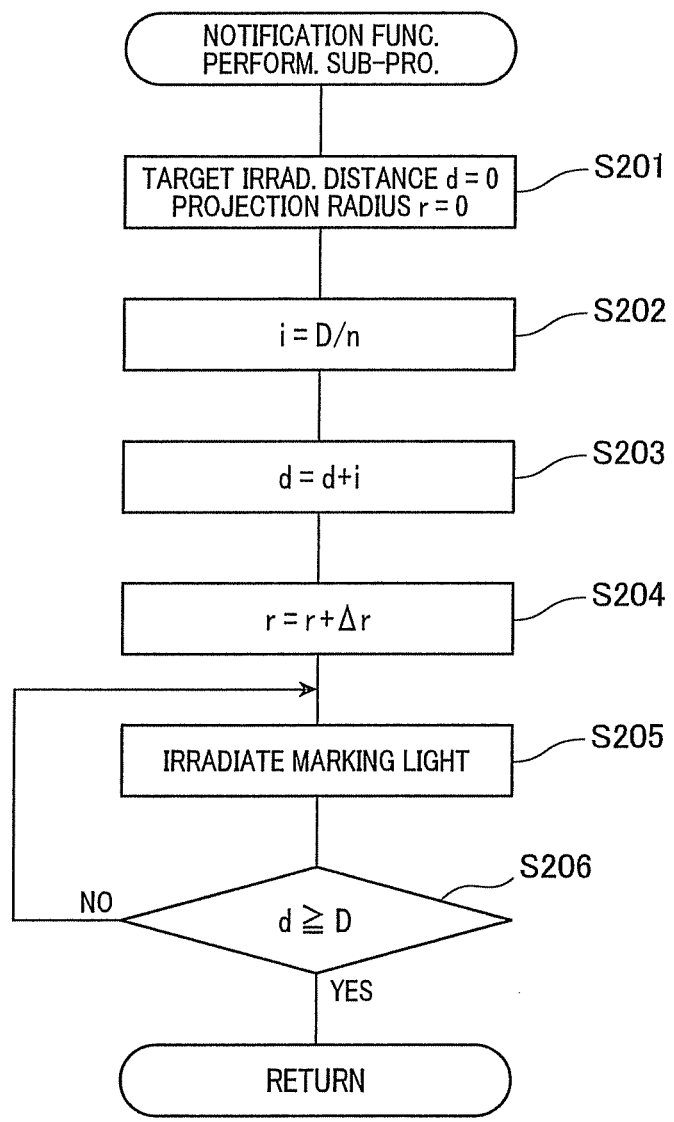

FIG. 18
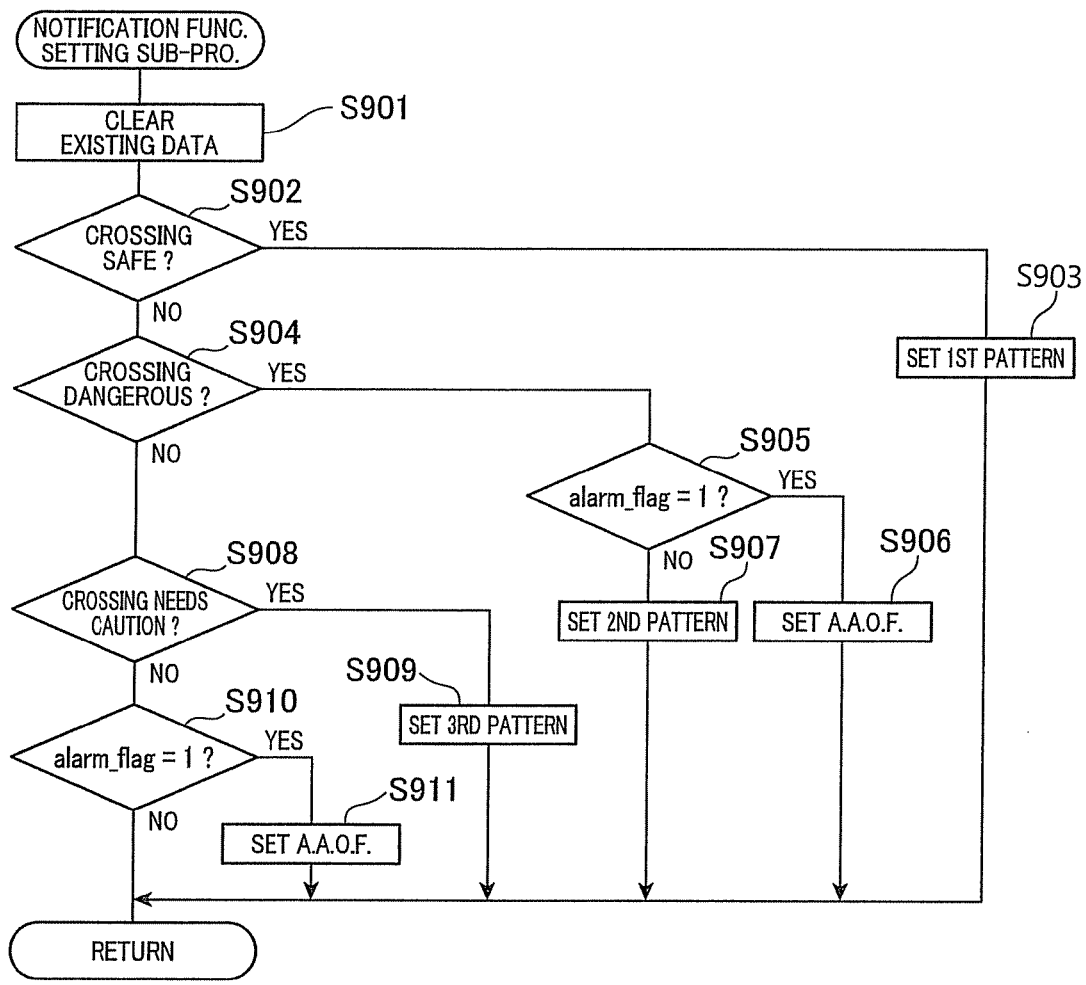
FIG.19A    FIG.19B    FIG.19C
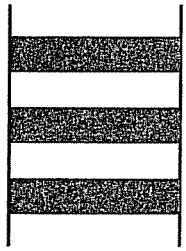  

$\theta_V = 0°$ $\theta_V = 30°$

30 α °

$\theta_V = 60°$

60 α °

PEDESTRIAN NOTIFICATION APPARATUS

CROSS-REFERENCE TO RELATED APPLICATION

This application is based on and claims priority from Japanese Patent Application No. 2012-191928, filed on Aug. 31, 2012, the content of which is hereby incorporated by reference in its entirety into this application.

BACKGROUND

1. Technical Field

The present invention relates to a pedestrian notification apparatus that is used in a vehicle to notify a pedestrian of information, such as the fact that the apparatus has recognized the presence of the pedestrian.

2. Description of Related Art

There are known techniques for recognizing the ambient environment of a vehicle and notifying, when there is an obstacle which the vehicle may collide with, the vehicle driver of the presence of the obstacle. For example, Japanese Unexamined Patent Application Publication No. H11-139229 (to be simply referred to as Patent Document 1 hereinafter) discloses an apparatus that is configured to notify the vehicle driver, when there is a nearby obstacle which has not been perceived by the vehicle driver, of the presence of the obstacle by outputting an audible alarm.

However, with the configuration of the apparatus disclosed in Patent Document 1, when the obstacle is a pedestrian, it is impossible for the apparatus to notify the pedestrian of the presence of the vehicle nearing the pedestrian.

On the other hand, there are also known techniques for notifying, when there is a pedestrian in front of the vehicle, the pedestrian of the presence of the vehicle nearing the pedestrian. For example, Japanese Unexamined Patent Application Publication No. 2011-79349 (to be simply referred to as Patent Document 2 hereinafter) discloses an apparatus that is configured to transmit a signal, via a visible light irradiated by a headlight of the vehicle, to a portable device carried by the pedestrian. Consequently, upon receipt of the signal by the portable device, the pedestrian is notified of the presence of the vehicle. Further, the portable device is configured to output a pedestrian signal upon receipt of the signal transmitted by the apparatus. Consequently, upon receipt of the pedestrian signal by the apparatus, the vehicle driver is also notified of the presence of the pedestrian.

However, with the configuration of the apparatus disclosed in Patent Document 2, it is impossible for the apparatus to further notify the pedestrian that the vehicle driver has recognized the presence of the pedestrian.

Japanese Unexamined Patent Application Publication No. 2008-143505 (to be simply referred to as Patent Document 3 hereinafter) discloses an apparatus that is configured to notify the vehicle driver of information on the ambient environment of the vehicle by displaying the information on the road surface in front of the vehicle. More specifically, the information includes, for example, road signs present in front of the vehicle and the distance from the vehicle to a preceding vehicle. The apparatus displays the information by controlling the light distribution of a headlight of the vehicle.

However, with the configuration of the apparatus disclosed in Patent Document 3, it is impossible for the apparatus to provide information to a pedestrian who is present near the vehicle. Consequently, it is difficult for the pedestrian to determine whether the vehicle driver has recognized the presence of the pedestrian; it is also difficult for the pedestrian to make a decision on how to behave in a way which is safe and preferable for the vehicle driver.

SUMMARY

According to exemplary embodiments, a pedestrian notification apparatus is provided which is configured to be used in a vehicle. The apparatus includes an ambient object detector, a notification target detector and a notifier. The ambient object detector is configured to detect ambient objects present around the vehicle. The notification target detector is configured to detect a notification target pedestrian based on the detection results of the ambient object detector. The notifier is configured to notify the notification target pedestrian that the notification target pedestrian has been detected by the notification target detector.

With the above configuration, it is possible to notify the notification target pedestrian that the presence of the pedestrian has been recognized by the vehicle (more precisely the pedestrian notification apparatus provided on the vehicle). Consequently, it is possible to make the pedestrian feel at ease; it is also possible to allow the pedestrian to make a decision on how to behave in a way which is safe and preferable for the driver of the vehicle.

It is preferable that the notifier is capable of irradiating a light outside of the vehicle.

In one further implementation, the apparatus further includes a position detector that is configured to detect a position of the notification target pedestrian. The notifier includes a marking light irradiator that irradiates, based on the position of the notification target pedestrian detected by the position detector, a predetermined marking light onto a road surface. The marking light is indicative of information to be communicated to the notification target pedestrian.

The marking light irradiator may be configured to irradiate the marking light a predetermined number of times so as to make the marking light gradually approach the notification target pedestrian.

The marking light irradiator may also be configured to irradiate the marking light with at least one of the projection area, color, luminance, wavelength and shape of the marking light being changed as the marking light approaches the notification target pedestrian. Further, in this case, it is preferable for the marking light irradiator to irradiate the marking light with the projection area of the marking light being increased as the marking light approaches the notification target pedestrian.

The marking light irradiator may also be configured to: determine an area on the road surface where the notification target pedestrian is present based on the position of the notification target pedestrian detected by the position detector; and irradiate the marking light so as not to cover the area on the road surface.

The marking light irradiator may also be configured to irradiate, based on the position of the notification target pedestrian detected by the position detector, the marking light so as to make the marking light follow the notification target pedestrian.

The apparatus may further include a speed detector that is configured to detect a moving speed of the notification target pedestrian. In this case, the marking light irradiator may be configured to irradiate the marking light with the color of the marking light being changed according to both the position of the notification target pedestrian detected by the position detector and the moving speed of the notification target pedestrian detected by the speed detector.

In another further implementation, the apparatus further includes a position detector that is configured to detect a position of the notification target pedestrian. The notifier includes a pattern irradiator that irradiates, based on the position of the notification target pedestrian detected by the position detector, a predetermined pattern onto a road surface. The predetermined pattern is indicative of information to be communicated to the notification target pedestrian.

The pattern irradiator may be configured to selectively irradiate one of first, second and third patterns as the predetermined pattern. The first pattern is indicative of that a crossing of a road intended by the notification target pedestrian is safe; the second pattern is indicative of that the crossing of the road intended by the notification target pedestrian is dangerous; the third pattern is indicative of that the crossing of the road intended by the notification target pedestrian needs caution. In addition, the first pattern may be the pattern of a crosswalk.

The apparatus may further include a steering angle sensor that is configured to sense a steering angle of the vehicle. In this case, the pattern irradiator may be configured to irradiate the predetermined pattern at an inclination angle that is determined based on the steering angle sensed by the steering angle sensor.

The pattern irradiator may also be configured to irradiate the predetermined pattern by taking the position of the notification target pedestrian detected by the position detector as a target irradiation position.

The pattern irradiator may also be configured to irradiate the predetermined pattern with a maximum irradiation width of the predetermined pattern set to the width of a lane on which the vehicle runs. Alternatively, the pattern irradiator may also be configured to irradiate the predetermined pattern with the maximum irradiation width of the predetermined pattern set to the width of the vehicle.

The pattern irradiator may also be configured to irradiate the predetermined pattern so as to gradually display the predetermined pattern on the road surface from the feet of the notification target pedestrian in a predicted advancing direction of the notification target pedestrian.

The apparatus may further include a crossing intention determiner that is configured to determine whether the notification target pedestrian has an intention of crossing a road.

Moreover, the apparatus may further include a crossing safety determiner that is configured to determine, when the notification target pedestrian is determined by the crossing intention determiner as having an intention of crossing the road, safety of the crossing of the road intended by the notification target pedestrian.

Furthermore, when the crossing of the road intended by the notification target pedestrian is determined by the crossing safety determiner as being safe, the pattern irradiator may irradiate the first pattern being indicative of that the crossing of the road is safe. In contrast, when the crossing of the road intended by the notification target pedestrian is determined by the crossing safety determiner as being dangerous, the pattern irradiator may irradiate the second pattern being indicative of that the crossing of the road is dangerous. Otherwise, when the crossing of the road intended by the notification target pedestrian is determined by the crossing safety determiner as needing caution, the pattern irradiator may irradiate the third pattern being indicative of that the crossing of the road needs caution.

In yet another further implementation, the notifier includes an audible alarm outputter that is configured to output an audible alarm to the outside of the vehicle.

The apparatus may further include a position detector that is configured to detect a position of the notification target pedestrian. In this case, the audible alarm outputter may be configured to output the audible alarm based on the position of the notification target pedestrian detected by the position sensor.

Moreover, the apparatus may further include a speed detector that is configured to detect a moving speed of the notification target pedestrian. In this case, the audible alarm outputter may be configured to output the audible alarm with at least one of the volume, pitch and type of the audible alarm being changed according to both the position of the notification target pedestrian detected by the position detector and the moving speed of the notification target pedestrian detected by the speed detector.

The audible alarm outputter may also be configured to output the audible alarm when the notification target pedestrian is detected by the notification target detector as failing to face toward the vehicle for not less than a predetermined time.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 3 is a flow chart illustrating a pedestrian notification process according to the first embodiment;

FIG. 4 is a flow chart illustrating a pedestrian information acquiring sub-process according to the first embodiment;

FIG. 5 is a flow chart illustrating a notification function performing sub-process according to the first embodiment;

FIG. 18 is a flow chart illustrating a notification function setting sub-process according to the third embodiment;

FIG. 19A shows a first pattern for irradiation which indicates that the crossing of a road intended by a pedestrian is safe;

FIG. 19B shows a second pattern for irradiation which indicates that the crossing of the road intended by the pedestrian is dangerous;

FIG. 19C shows a third pattern for irradiation which indicates that the crossing of the road intended by the pedestrian needs caution;

DESCRIPTION OF EMBODIMENTS

Exemplary embodiments will be described hereinafter with reference to FIGS. 1-25. It should be noted that in the exemplary embodiments and claims of this application, the term "a pedestrian" encompasses not only a person moving or likely to move by walking but also a person in a similar condition, for example a person moving or likely to move by a bicycle or a wheelchair.

First Embodiment

Figure 1:
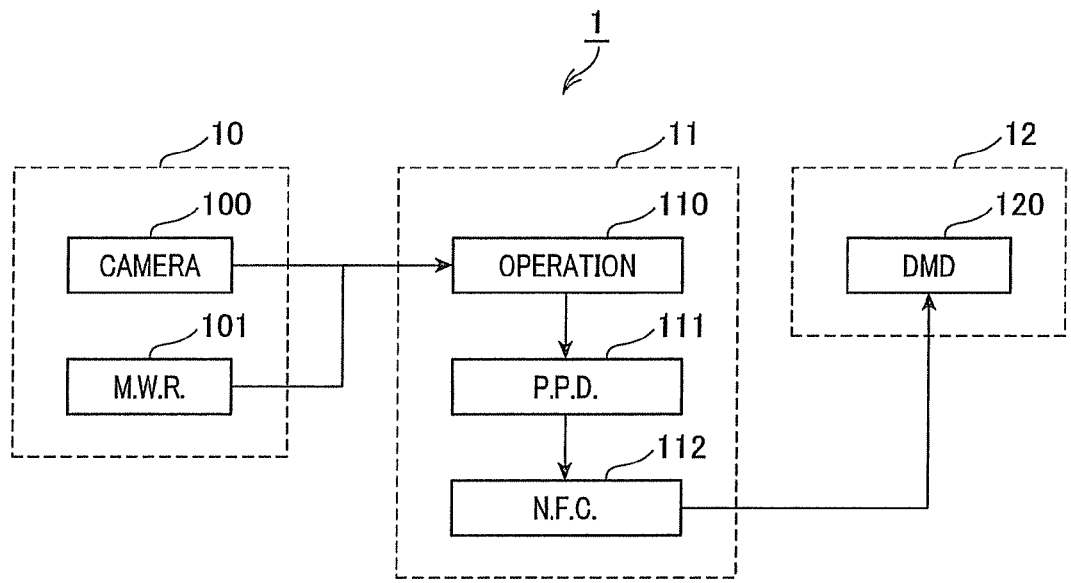
FIG. 1 is a functional block diagram illustrating the overall configuration of a pedestrian notification apparatus according to a first embodiment.

FIG. 1 shows the overall configuration of a pedestrian notification apparatus 1 according to a first embodiment. The pedestrian notification apparatus 1 is configured to be used in a vehicle V1.

As shown in FIG. 1, the pedestrian notification apparatus 1 includes an information acquiring unit 10, an ECU (Electronic Control Unit) 11 and a notification function performing unit (or notifier) 12.

The information acquiring unit 10 includes a camera (or ambient object detector) 100 and a millimeter-wave radar (or position detector and speed detector) 101.

The camera 100 is configured to acquire images of the ambient environment of the vehicle V1 and detect ambient objects present around the vehicle V1 based on the acquired images.

The millimeter-wave radar (abbreviated to M. W. R. in FIG. 1) 101 is configured to: radiate an electromagnetic wave in the millimeter band to the ambient environment of the vehicle V1; receive reflected waves that are created by reflection of the electromagnetic wave by ambient objects present around the vehicle V1; and detect the distances of the ambient objects from the vehicle V1, the azimuths of the ambient objects with respect to the vehicle V1 and the moving speeds of the ambient objects based on the reflected waves. For example, when there is a pedestrian P present near the vehicle V1, the millimeter-wave radar 101 detects the distance from the vehicle V1 to the pedestrian P, the azimuth of the pedestrian P with respect to the vehicle V1, and the moving (or walking) speed of the pedestrian P.

Figure 2:
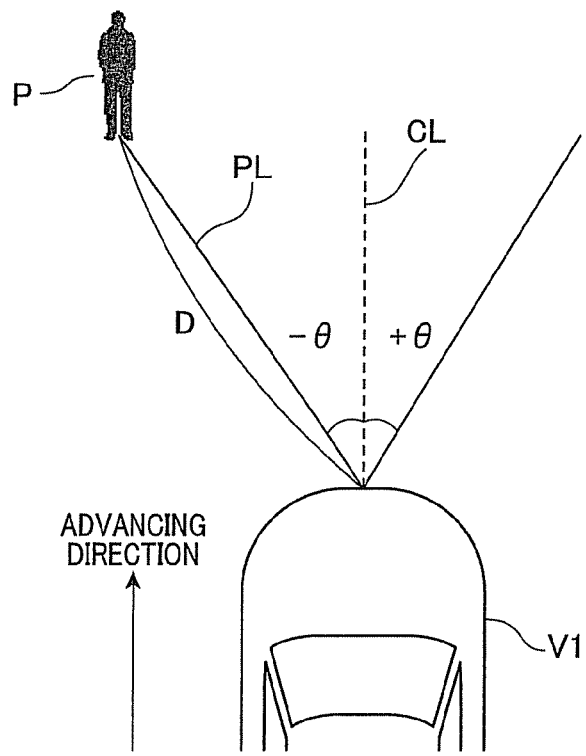
FIG. 2 is a schematic view illustrating parameters D and θ which together represent the position of a pedestrian.

In addition, as shown in FIG. 2, the millimeter-wave radar 101 actually detects: the distance D from a front center part of the vehicle V1 to the pedestrian P as the distance from the vehicle V1 to the pedestrian P; and the angle θ between an imaginary line CL that extends from the front center part of the vehicle V1 along the advancing direction of the vehicle V1 and an imaginary line PL that extends straight from the front center part of the vehicle V1 to the pedestrian P as the azimuth of the pedestrian P with respect to the vehicle V1. Further, the angle θ is defined to take a positive value when the pedestrian P is positioned on the right side of the imaginary line CL and a negative value when the pedestrian P is positioned on the left side of the imaginary line CL.

Both the camera 100 and the millimeter-wave radar 101 are mounted to, for example, a center top portion of a front glass of the vehicle V1 so as to be oriented toward the front of the vehicle V1. All the detection results of the camera 100 and the millimeter-wave radar 101, which together represent information acquired by the information acquiring unit 10, are sent to the ECU 11.

Referring back to FIG. 1, the ECU 11 is an on-vehicle electronic control unit which is configured to control the notification function performing unit 12 based on the information acquired by the information acquiring unit 10. The ECU 11 includes an operation part 110, a pedestrian presence determining part (or notification target detector) 111 and a notification function controlling part 112.

The operation part 110 is functionally configured with software and a microprocessor (not shown). The operation part 110 performs, based on the information acquired by the information acquiring unit 10, various arithmetical and logical operations necessary for the notification function controlling part 112 to control the notification function performing unit 12. The operations include, for example, numerical calculations and comparisons. The results of the operations are then sent to the pedestrian presence determining part 111.

The pedestrian presence determining (abbreviated to P. P. D. in FIG. 1) part 111 determines, based on the operation results of the operation part 110, whether there is a pedestrian present near the vehicle V1. The result of the determination is then sent to the notification function controlling part 112.

The notification function controlling (abbreviated to N. F. C. in FIG. 1) part 112 controls the notification function performing unit 12 based on the determination result of the pedestrian presence determining part 111.

The notification function performing unit 12 is configured with a DMD (Digital Micromirror Device) 120. The DMD 120 is mounted, for example, in the vicinity of a front bumper of the vehicle V1. The DMD 120 performs a pedestrian notification function under the control of the notification function controlling part 112 of the ECU 11.

Specifically, the DMD 120 includes a light source (not shown) and a number of microscopic mirrors (not shown) that are arranged to reflect and thereby project light emitted from the light source. The DMD 120 is a kind of MEMS (Micro Electro Mechanical System) which realizes a desired light distribution by individually varying the angles of the mirrors via electrostatic attraction. In the present embodiment, the DMD 120 functions as a marking light irradiator to irradiate, based on the position of a pedestrian, a predetermined marking light onto the road surface.

After having described the overall configuration of the pedestrian notification apparatus 1 according to the present embodiment, operation thereof will be described hereinafter with reference to FIGS. 3-6.

FIG. 3 shows a pedestrian notification process according to the present embodiment, which is repeatedly performed by the pedestrian notification apparatus 1 in a cycle of, for example, 100 ms.

As shown in FIG. 3, in the present embodiment, the pedestrian notification process is comprised of a pedestrian information acquiring sub-process and a notification function performing sub-process; the two sub-processes are sequentially executed at steps S100 and S200.

First, the pedestrian information acquiring sub-process will be described with reference to FIG. 4.

At step S101, the camera 100 detects ambient objects present around the vehicle V1. Then, the detection results are sent, via the operation part 110 of the ECU 11, to the pedestrian presence determining part 111 of the ECU 11.

At step S102, the pedestrian presence determining part 111 determines, based on the detection results of the camera 100, whether there is a pedestrian P present near the vehicle V1.

If the result of the determination at step S102 produces a "No" answer, then the sub-process returns to step S101.

In contrast, if the determination at step S102 produces a "Yes" answer, then the sub-process proceeds to step S103.

At step S103, the operation part 110 of the ECU 11 computes, based on the detection results of the millimeter-wave radar 101, the distance D from the vehicle V1 to the pedestrian P.

Further, at step S104, the operation part 110 computes, based on the detection results of the millimeter-wave radar 101, the azimuth θ of the pedestrian P with respect to the vehicle V1.

Consequently, the position of the pedestrian P is ascertained which is represented by the above-computed distance D and azimuth θ.

After step S104, the pedestrian information acquiring sub-process is terminated to return to the main process (i.e., the pedestrian notification process shown in FIG. 3).

Next, the notification function performing sub-process will be described with reference to FIG. 5.

In the present embodiment, the pedestrian notification apparatus 1 performs the pedestrian notification function by irradiating a marking light to the vicinity of the vehicle V1. Further, the marking light is irradiated in such a manner that: the marking light is gradually moved to the pedestrian P in n times, where n is a predetermined integer not less than 2; and the projection area of the marking light (i.e., the area of that part of the road surface onto which the marking light is projected) is gradually increased as the marking light gets closer to the pedestrian P.

Specifically, at step S201 of the notification function performing sub-process, the operation part 110 of the ECU 11 initializes both a target irradiation distance d for irradiating the marking light and a projection radius r of the marking light to 0 (zero). Here, the projection radius r denotes the radius of that part of the road surface onto which the marking light is projected, and represents the size of the marking light.

At step S202, the operation part 110 computes an irradiation interval i as the quotient of the distance D from the vehicle V1 to the pedestrian P divided by the predetermined number n. Here, the distance D from the vehicle V1 to the pedestrian P has been previously computed in the pedestrian information acquiring sub-process; the predetermined number n represents the number of times the marking light is irradiated and is not less than 2 as described above.

At step S203, the operation part 110 increases the target irradiation distance d by the irradiation interval i.

At step S204, the operation part 110 increases the projection radius r by a predetermined increment Δr.

Then, the operation part 110 sends both the above-computed target irradiation distance d and projection radius r to the notification function controlling part 112.

At step S205, the notification function controlling part 112 controls the DMD 120 to irradiate, for a predetermined length t of time, the marking light which has the projection radius r and the projection center set to a point that is determined by the target irradiation distance d and the azimuth θ of the pedestrian P with respect to the vehicle V1. Here, the projection center denotes the center of that part of the road surface onto which the marking light is projected.

At step S206, the operation part 110 determines whether the target irradiation distance d has increased to become longer than or equal to the distance D from the vehicle V1 to the pedestrian P.

If the determination at step S206 produces a "No" answer, in other words, if the marking light has not yet reached the pedestrian P, then the sub-process returns to step S203.

In contrast, if the determination at step S206 produces a "Yes" answer, in other words, if the marking light has been irradiated n times and has finally reached the pedestrian P, then the notification function controlling part 112 of the ECU 11 stops the operation of the notification function performing unit 12.

Thereafter, the notification function performing sub-process is terminated to return to the main process (i.e., the pedestrian notification process shown in FIG. 3), and then the main process goes to the end.

Figure 6:
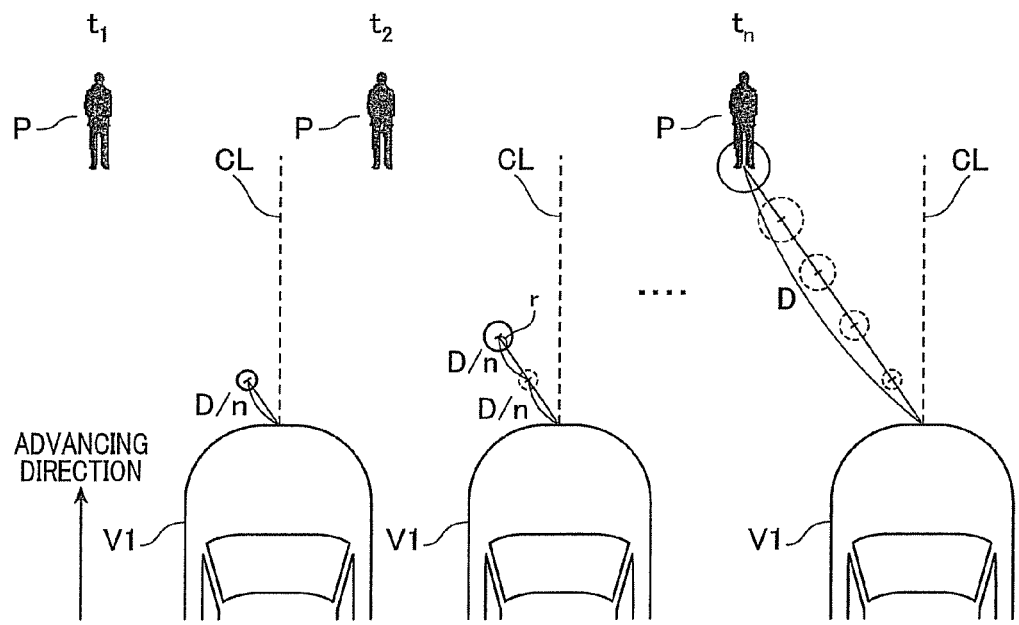
FIG. 6 is a schematic view illustrating the manner of irradiating a marking light to a pedestrian by the pedestrian notification apparatus according to the first embodiment.

Consequently, by repeating above steps S203-S206, as shown in FIG. 6, the marking light is made to gradually approach the pedestrian P, with the projection area of the marking light being gradually increased at the same time.

In addition, in the above notification function performing sub-process, the predetermined number n of irradiation times, the predetermined increment Δr of the projection radius, and the predetermined length t of irradiation time may be set either at the factory in advance or by the vehicle driver after the pedestrian notification apparatus 1 has been put in use in the vehicle V1. Furthermore, those parameters may also be variably set during operation according to the ambient environment of the vehicle V1.

According to the present embodiment, it is possible to achieve the following advantageous effects.

In the present embodiment, the pedestrian notification apparatus 1 computes the target irradiation distance d and the projection radius r of the marking light and irradiates the marking light based on the computed target irradiation distance d and projection radius r. Consequently, by repeating the above computing and irradiating steps, the marking light is made to gradually approach the pedestrian P with the projection area of the marking light being gradually increased at the same time, until reaching and thereby illuminating the pedestrian P. As a result, the pedestrian P can be notified that the vehicle V1 (more precisely the pedestrian notification apparatus 1 provided on the vehicle V1) has recognized the presence of the pedestrian P.

Second Embodiment

Figure 7:
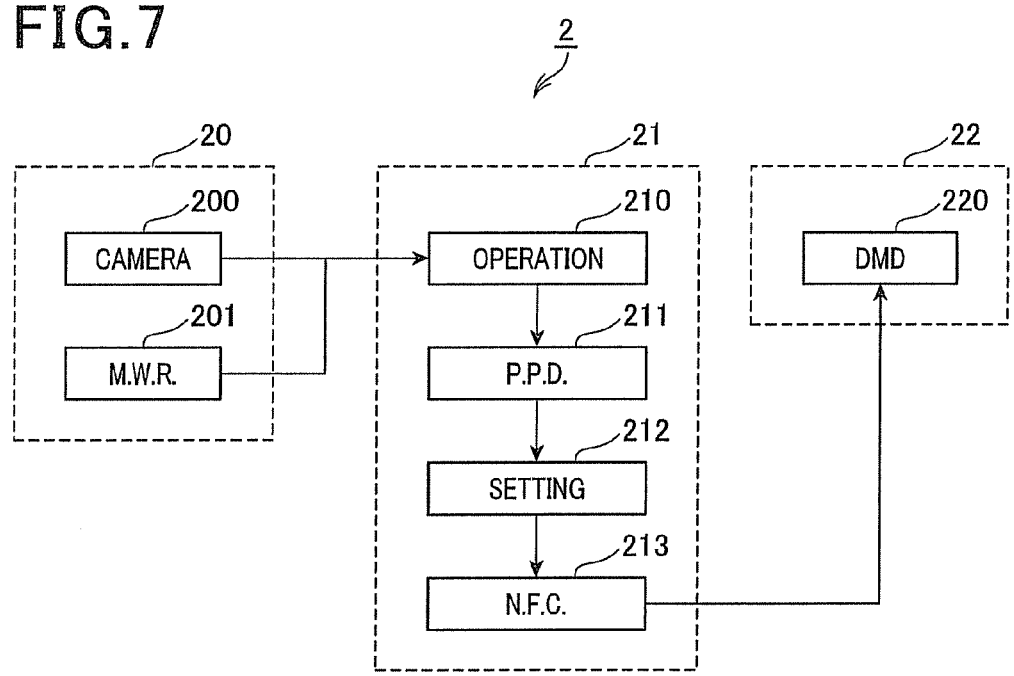
FIG. 7 is a functional block diagram illustrating the overall configuration of a pedestrian notification apparatus according to a second embodiment.

FIG. 7 shows the overall configuration of a pedestrian notification apparatus 2 according to a second embodiment. The pedestrian notification apparatus 2 is configured to be used in a vehicle V1.

As shown in FIG. 7, the pedestrian notification apparatus 2 includes an information acquiring unit 20, an ECU 21 and a notification function performing unit (or notifier) 22.

The information acquiring unit 20 and the notification function performing unit 22 according to the present embodiment respectively have substantially the same configurations as the information acquiring unit 10 and the notification function performing unit 12 according to the first embodiment. Therefore, only the ECU 21 according to the present embodiment will be described hereinafter omitting description of the information acquiring unit 20 and the notification function performing unit 22.

Referring to FIG. 7, in the present embodiment, the ECU 21 includes an operation part 210, a pedestrian presence determining part (or notification target detector) 211, a setting part 212 and a notification function controlling part 213.

The operation part 210 is functionally configured with software and a microprocessor (not shown). The operation part 210 performs, based on the information acquired by the information acquiring unit 20, various arithmetical and logical operations necessary for the notification function controlling part 213 to control the notification function performing unit 12. The operations include, for example, computing the degree of danger to a pedestrian P and comparing the computed degree of danger with predetermined thresholds. The results of the operations are then sent to the pedestrian presence determining part 211.

The pedestrian presence determining (abbreviated to R P. D. in FIG. 7) part 211 determines, based on the operation results of the operation part 210, whether there is a pedestrian present near the vehicle V1. The result of the determination is then sent to the setting part 212.

The setting part 212 sets, based on the operation results of the operation part 210 and the determination result of the pedestrian presence determining part 211, the color of the marking light to be irradiated by the DMD 220 of the notification function performing unit 22. The setting result is then sent to the notification function controlling part 213.

The notification function controlling (abbreviated to N. F. C. in FIG. 7) part 213 controls the notification function performing unit 22 based on the determination result of the pedestrian presence determining part 211 and the setting result of the setting part 212.

Next, operation of the pedestrian notification apparatus 2 according to the present embodiment will be described hereinafter with reference to FIGS. 8-11.

Figure 8:
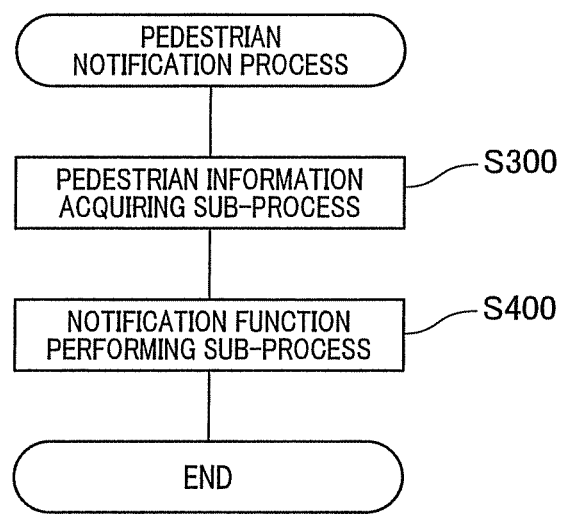
FIG. 8 is a flow chart illustrating a pedestrian notification process according to the second embodiment.

FIG. 8 shows a pedestrian notification process according to the present embodiment, which is repeatedly performed by the pedestrian notification apparatus 2 in a cycle of, for example, 100 ms.

As shown in FIG. 8, in the present embodiment, the pedestrian notification process is comprised of a pedestrian information acquiring sub-process and a notification function performing sub-process; the two sub-processes are sequentially executed at steps S300 and S400.

Figure 9:
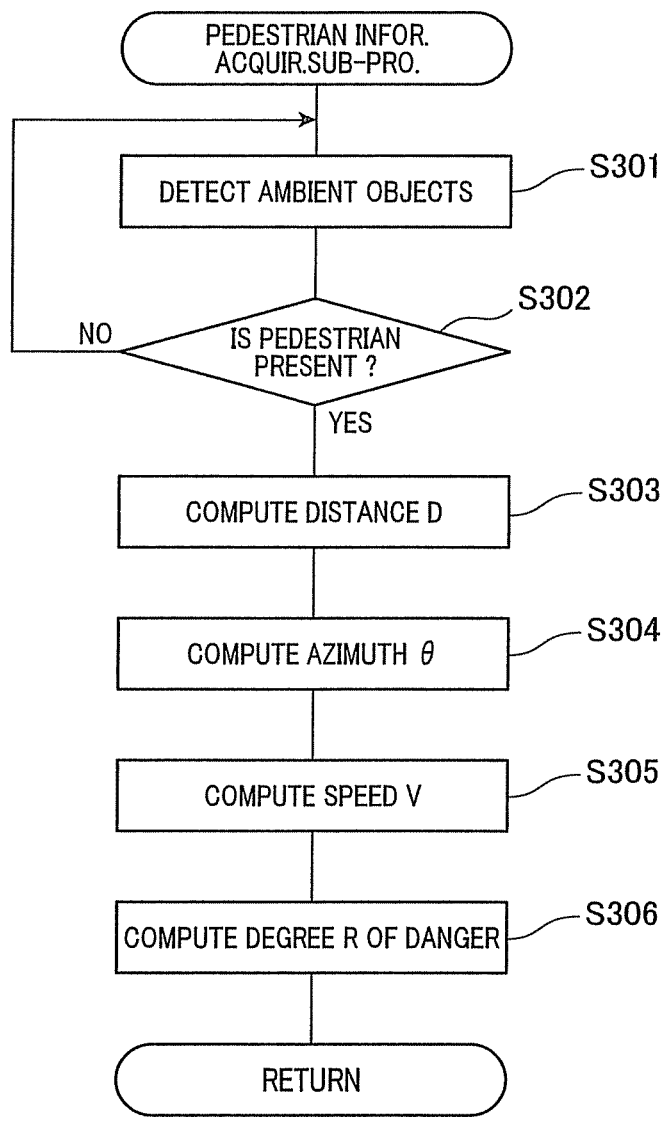
FIG. 9 is a flow chart illustrating a pedestrian information acquiring sub-process according to the second embodiment.

First, the pedestrian information acquiring sub-process will be described with reference to FIG. 9.

At step S301, the camera 200 detects ambient objects present around the vehicle V1. Then, the detection results are sent, via the operation part 210 of the ECU 21, to the pedestrian presence determining part 211 of the ECU 21.

At step S302, the pedestrian presence determining part 211 determines, based on the detection results of the camera 200, whether there is a pedestrian P present near the vehicle V1.

If the result of the determination at step S302 produces a "No" answer, then the sub-process returns to step S301.

In contrast, if the determination at step S302 produces a "Yes" answer, then the sub-process proceeds to step S303.

At step S303, the operation part 210 of the ECU 21 computes, based on the detection results of the millimeter-wave radar 201, the distance D from the vehicle V1 to the pedestrian P.

Further, at step S304, the operation part 210 computes, based on the detection results of the millimeter-wave radar 201, the azimuth θ of the pedestrian P with respect to the vehicle V1.

Consequently, the position of the pedestrian P is ascertained which is represented by the above-computed distance D and azimuth θ.

Furthermore, at step S305, the operation part 210 computes, based on the detection results of the millimeter-wave radar 201, the moving speed V of the pedestrian P.

Then, at step S306, the operation part 210 computes, based on the above-computed distance D, azimuth θ and moving speed V, a degree R of danger to the pedestrian P.

Here, the degree R of danger to the pedestrian P denotes the degree of danger of the situation in which the pedestrian P is placed. In the present embodiment, the degree R of danger to the pedestrian P is evaluated based on the distance D from the vehicle V1 to the pedestrian P, the azimuth θ of the pedestrian P with respect to the vehicle V1 and the moving speed V of the pedestrian P. More specifically, when both the distance D and the absolute value of the azimuth θ are small, the degree R of danger to the pedestrian P is evaluated (i.e., computed by the operation part 210) to be high. In contrast, the degree R of danger to the pedestrian P is evaluated to be low when both the distance D and the absolute value of the azimuth θ are large and the absolute value of the moving speed V is small or the moving direction of the pedestrian P is away from the vehicle V1 or from a point in front of the vehicle V1.

After step S306, the pedestrian information acquiring sub-process is terminated to return to the main process (i.e., the pedestrian notification process shown in FIG. 8).

Figure 10:
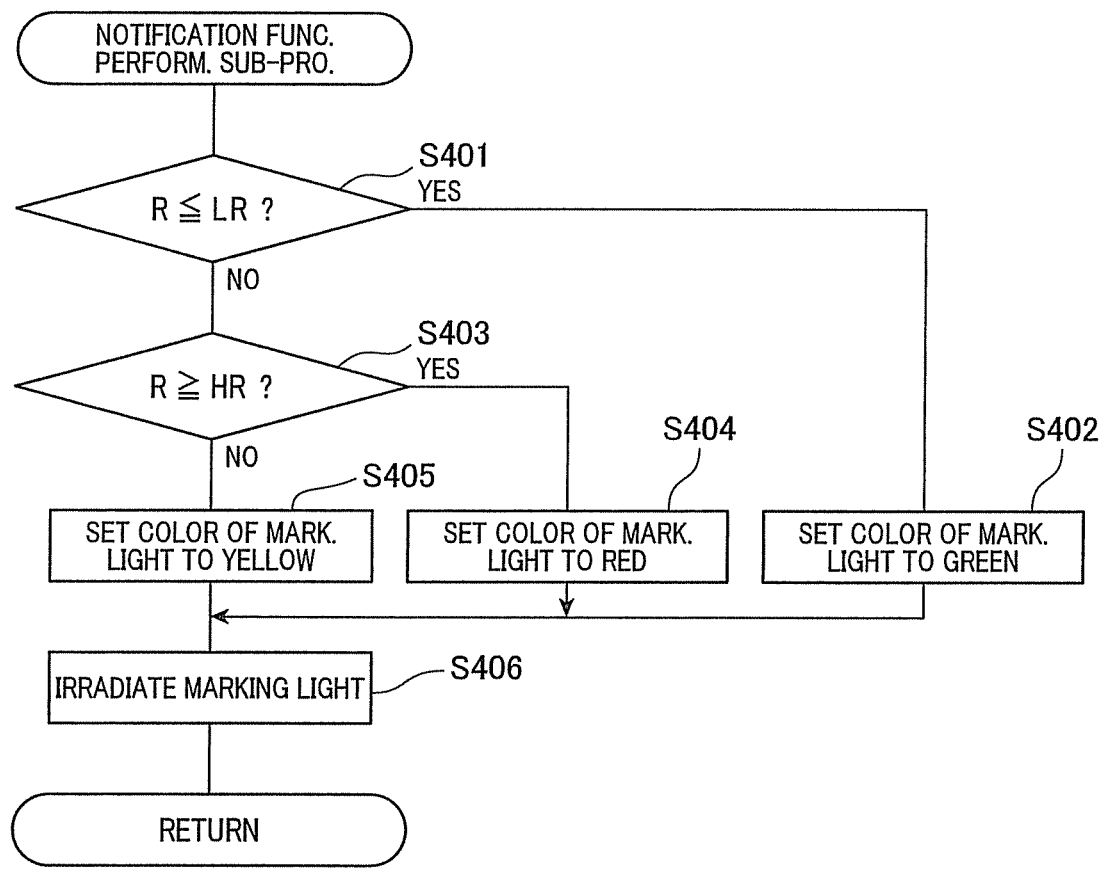
FIG. 10 is a flow chart illustrating a notification function performing sub-process according to the second embodiment.

Next, the notification function performing sub-process will be described with reference to FIG. 10.

In the present embodiment, the pedestrian notification apparatus 2 performs the pedestrian notification function by irradiating a marking light according to the degree R of danger to the pedestrian P.

Specifically, at step S401 of the notification function performing sub-process, the operation part 210 of the ECU 21 checks whether the degree R of danger to the pedestrian P computed in the pedestrian information acquiring sub-process is lower than or equal to a predetermined lower threshold LR.

If the result of the check at step S401 is "Yes", then the sub-process proceeds to step S402, at which the setting part 212 of the ECU 21 sets the color of the marking light to green. Thereafter, the sub-process goes on to step S406.

In contrast, if the result of the check at step S401 is "No", then the sub-process proceeds to step S403.

At step S403, the operation part 210 of the ECU 21 further checks whether the degree R of danger to the pedestrian P is higher than or equal to a predetermined higher threshold HR.

If the result of the check at step S403 is "Yes", then the sub-process proceeds to step S404, at which the setting part 212 of the ECU 21 sets the color of the marking light to red. Thereafter, the sub-process goes on to step S406.

In contrast, if the result of the check at step S403 is "No", then the sub-process proceeds to step S405, at which the setting part 212 of the ECU 21 sets the color of the marking light to yellow. Thereafter, the sub-process goes on to step S406.

At step S406, the notification function controlling part 213 of the ECU 21 controls the DMD 220 of the notification function performing unit 22 to irradiate the marking light to the position of the pedestrian P in the color set at either of steps S402, S404 and S405. As described previously, the position of the pedestrian P is represented by the distance D from the vehicle V1 to the pedestrian P and the azimuth θ of the pedestrian P with respect to the vehicle V1, both of which have been already computed in the pedestrian information acquiring sub-process.

Figure 11:
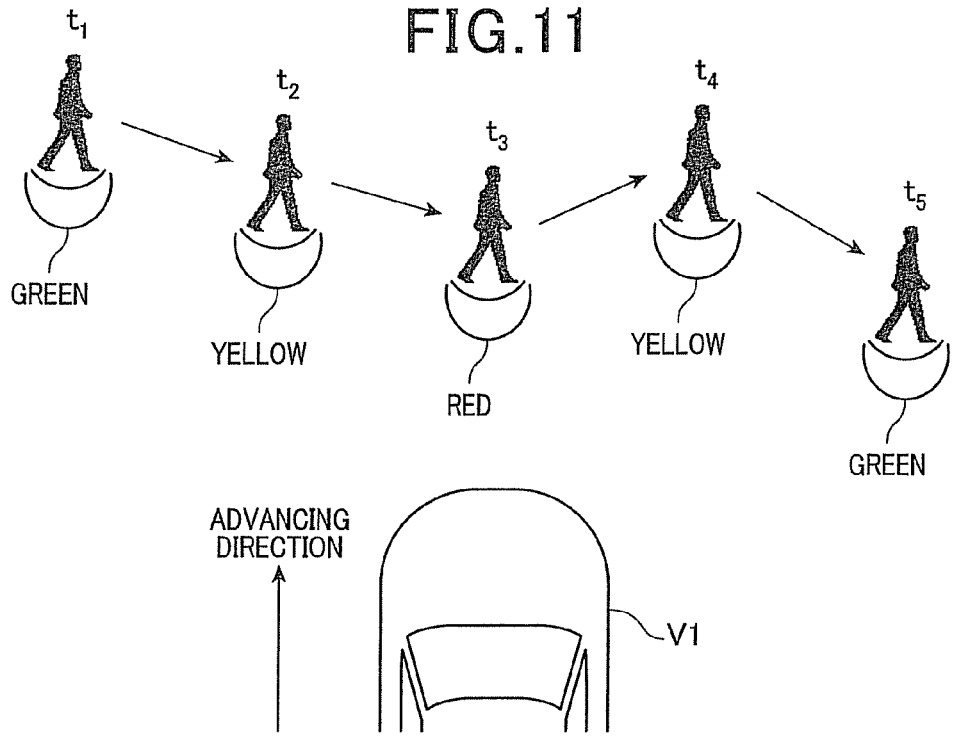
FIG. 11 is a schematic view illustrating the manner of irradiating a marking light to a pedestrian by the pedestrian notification apparatus according to the second embodiment.

In addition, as shown in FIG. 11, in the present embodiment, the marking light is irradiated so as to have a crescent shape on the road surface without covering an area on the road surface where the pedestrian P is present; the area is determined based on the position of the pedestrian P. Consequently, with the crescent shape, it is possible to considerably lower the degree of the marking light dazzling the pedestrian P.

After step S406, the notification function performing sub-process is terminated to return to the main process (i.e., the pedestrian notification process shown in FIG. 8), and then the main process goes to the end.

Further, the main process, which consists of the pedestrian information acquiring sub-process and the notification function performing sub-process, is repeatedly performed as described previously. Consequently, as shown in FIG. 11, the marking light is made to follow the pedestrian P with the color of the marking light being changed according to the degree R of danger to the pedestrian P.

According to the present embodiment, it is possible to achieve the following advantageous effects.

In the present embodiment, the pedestrian notification apparatus 2 sets the color of the marking light according to the degree R of danger to the pedestrian P and irradiates the marking light in the set color toward the pedestrian P. Further, the pedestrian notification apparatus 2 repeats the above setting and irradiating steps, thereby making the marking light follow the pedestrian P. Consequently, with the marking light following the pedestrian P, the pedestrian P can be notified that the vehicle V1 (more precisely the pedestrian notification apparatus 2 provided on the vehicle V1) has recognized the presence of the pedestrian P. Moreover, by setting the color of the marking light according to the degree R of danger to the pedestrian P, it becomes possible to visualize the degree R of danger, thereby more easily alerting the pedestrian P.

In addition, in the present embodiment, the marking light is made to follow the pedestrian P by repeating the steps of computing both the distance D from the vehicle V1 to the pedestrian P and the azimuth θ of the pedestrian P based on the detection results of the millimeter-wave radar 201 and irradiating the marking light to the position of the pedestrian P which is represented by the computed distance D and the azimuth θ. However, the marking light may also be made to follow the pedestrian P by other methods. For example, instead of repeatedly computing both the distance D and the azimuth θ based on the detection results of the millimeter-wave radar 201, it is also possible to repeatedly predict the position of the pedestrian P (or the amount of movement of the pedestrian P) based on the initial moving speed $V_0$ and initial azimuth $θ_0$ of the pedestrian P. Here, the initial moving speed $V_0$ and initial azimuth $θ_0$ of the pedestrian P can be determined by the operation part 210 of the ECU 21 based on the detection results of the millimeter-wave radar 201.

Moreover, in notifying the pedestrian P, the projection area (or the projection radius r) of the marking light is changed in the first embodiment and the color of the marking light is changed in the second embodiment. However, instead of changing the projection area and color of the marking light, it is also possible to change the luminance, wavelength or shape of the marking light.

Third Embodiment

Figure 12:
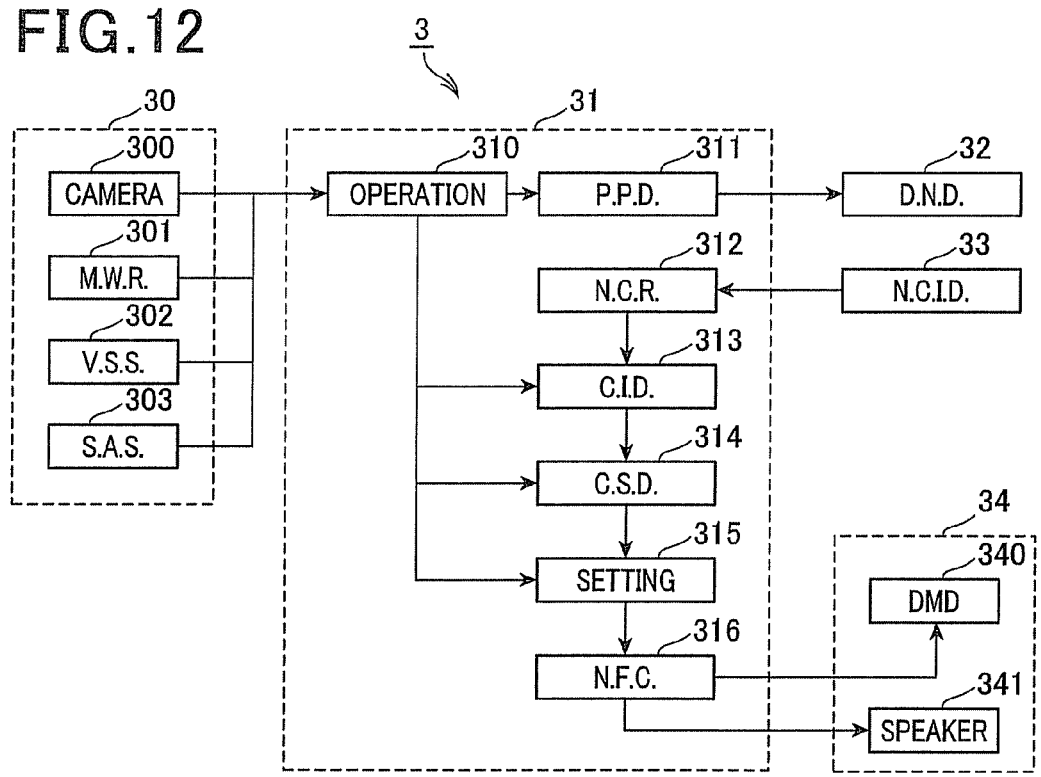
FIG. 12 is a functional block diagram illustrating the overall configuration of a pedestrian notification apparatus according to a third embodiment.

FIG. 12 shows the overall configuration of a pedestrian notification apparatus 3 according to a third embodiment. The pedestrian notification apparatus 3 is configured to be used in a vehicle V1.

As shown in FIG. 12, the pedestrian notification apparatus 3 includes an information acquiring unit 30, an ECU 31, a driver notification device 32, a notification command input device 33 and a notification function performing unit (or notifier) 34.

The information acquiring unit 30 includes a camera (or ambient object detector) 300, a millimeter-wave radar (or position detector, speed detector and inter-vehicle distance detector) 301, a vehicle speed sensor 302 and a steering angle sensor 303.

The camera 300 is configured to acquire images of the ambient environment of the vehicle V1 and detect ambient objects present around the vehicle V1 based on the acquired images.

The millimeter-wave radar (abbreviated to M. W. R. in FIG. 12) 301 is configured to detect the distance from the vehicle V1 to a pedestrian P (or an ambient object), the azimuth of the pedestrian P with respect to the vehicle V1, the moving speed (or walking speed) of the pedestrian P and the inter-vehicle distance between the vehicle V1 and a preceding vehicle running ahead of the vehicle V1. In addition, the distance from the vehicle V1 to the pedestrian P and the azimuth of the pedestrian P with respect to the vehicle V1 together represent the position of the pedestrian P.

The vehicle speed sensor (abbreviated to V. S. S. in FIG. 12) 302 is configured to detect the running speed of the vehicle V1.

The steering angle sensor (abbreviated to S. A. S. in FIG. 12) 303 is configured to detect the steering angle of the vehicle V1.

All the detection results of the camera 300, the millimeter-wave radar 301, the vehicle speed sensor 302 and the steering angle sensor 303, which together represent information acquired by the information acquiring unit 30, are sent to the ECU 31. In addition, both the camera 300 and the millimeter-wave radar 301 are mounted to, for example, a center top portion of a front glass of the vehicle V1 so as to be oriented toward the front of the vehicle V1.

The ECU 31 includes an operation part 310, a pedestrian presence determining part (or notification target detector) 311, a notification command receiving part 312, a crossing intention determining part (or crossing intention determiner) 313, a crossing safety determining part (or crossing safety determiner) 314, a setting part 315 and a notification function controlling part 316.

The operation part 310 is functionally configured with software and a microprocessor (not shown). The operation part 310 performs, based on the information acquired by the information acquiring unit 30, various arithmetical and logical operations necessary for the notification function controlling part 316 to control the notification function performing unit 34. The operations include, for example, computing the degree of danger to a pedestrian P and comparing the computed degree of danger with predetermined thresholds. The results of the operations are then sent to the pedestrian presence determining part 311, the crossing intention determining part 313, the crossing safety determining part 314 and the setting part 315.

The pedestrian presence determining (abbreviated to P. P. D. in FIG. 12) part 311 determines, based on the operation results of the operation part 310, whether there is a pedestrian P present near the vehicle V1. The result of the determination is then sent to the driver notification device 32.

The notification command receiving part (abbreviated to N. C. R. in FIG. 12) 312 receives, when a notification command is issued by the driver of the vehicle V1, a notification command signal that is indicative of the notification command and outputted from the notification command input device 33.

The crossing intention determining (abbreviated to C. I. D. in FIG. 12) part 313 determines, upon receipt of the notification command signal by the notification command receiving part 312, whether the pedestrian P has an intention of crossing the road on which the vehicle V1 is running based on the operation results of the operation part 310. The result of the determination is then sent to the crossing safety determining part 314.

The crossing safety determining (abbreviated to C. S. D. in FIG. 12) part 314 determines, based on the operation results of the operation part 310 and the determination result of the crossing intention determining part 313, whether the crossing of the road intended by the pedestrian P is safe, dangerous, or needs caution. The result of the determination is then sent to the setting part 315.

The setting part 315 sets, based on the determination result of the crossing safety determining part 314, the pedestrian notification function of the notification function performing unit 34. The setting result is then sent to the notification function controlling part 316.

The notification function controlling (abbreviated to N. F. C. in FIG. 12) part 316 controls the notification function performing unit 34 based on the setting result of the setting part 315.

The driver notification device (abbreviated to D. N. D. in FIG. 12) 32 notifies, when the determination result of the pedestrian presence determining part 311 of the ECU 31 indicates the presence of a pedestrian P near the vehicle V1, the driver of the vehicle V1 of the presence of the pedestrian P.

The notification command input device (abbreviated to N. C. I. D. in FIG. 12) 33 generates and outputs the notification command signal when the notification command is issued by the driver of the vehicle V1.

Specifically, when the driver of the vehicle V1 is notified of the presence of the pedestrian P by the driver notification device 32 and wishes the pedestrian notification apparatus 3 to notify the pedestrian P of the presence of the vehicle V1 nearing the pedestrian P, the driver issues the notification command by performing an input operation on the notification command input device 33. Consequently, the notification command input device 33 is caused by the input operation to generate and output the notification command signal. For example, the notification command input device 33 may be configured with a notification button provided on an instrument panel of the vehicle V1, a notification switch or a voice input unit. In those cases, the driver issues the notification command by pressing the notification button, turning the notification switch or speaking to the voice input unit.

The notification function performing unit 34 includes a DMD 340 and a speaker 341. Both the DMD 340 and the speaker 341 are mounted, for example, in the vicinity of a front bumper of the vehicle V1 and operate under the control of the notification function controlling part 316 of the ECU 31.

Specifically, the DMD 340 includes a light source (not shown) and a number of microscopic mirrors (not shown) that are arranged to reflect and thereby project light emitted from the light source. The DMD 340 is a kind of MEMS (Micro Electro Mechanical System) which realizes a desired light distribution by individually varying the angles of the mirrors via electrostatic attraction. The DMD 340 functions as a pattern irradiator to irradiate a predetermined pattern onto the road surface based on the position of the pedestrian P. On the other hand, the speaker 341 functions as an audible alarm outputter to output an audible alarm toward the position of the pedestrian P.

After having described the overall configuration of the pedestrian notification apparatus 3 according to the present embodiment, operation thereof will be described hereinafter with reference to FIGS. 13-24.

Figure 13:
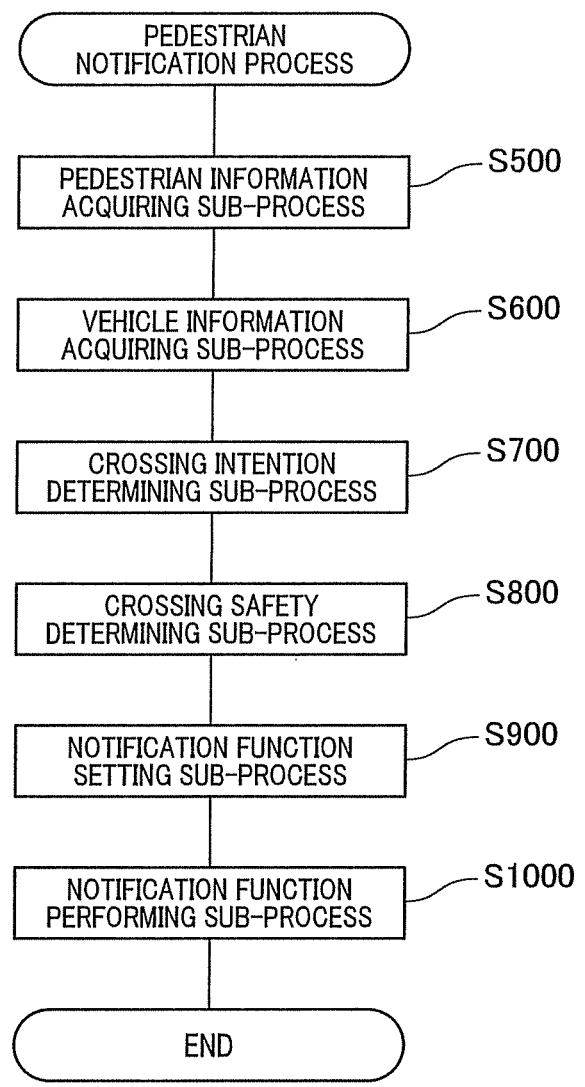
FIG. 13 is a flow chart illustrating a pedestrian notification process according to the third embodiment.

FIG. 13 shows a pedestrian notification process according to the present embodiment, which is repeatedly performed by the pedestrian notification apparatus 3 in a cycle of, for example, 100 ms.

As shown in FIG. 13, in the present embodiment, the pedestrian notification process is comprised of a pedestrian information acquiring sub-process, a vehicle information acquiring sub-process, a crossing intention determining sub-process, a crossing safety determining sub-process, a notification function setting sub-process and a notification function performing sub-process; those sub-processes are sequentially executed at steps S500, S600, S700, S800, S900 and S1000.

Figure 14:
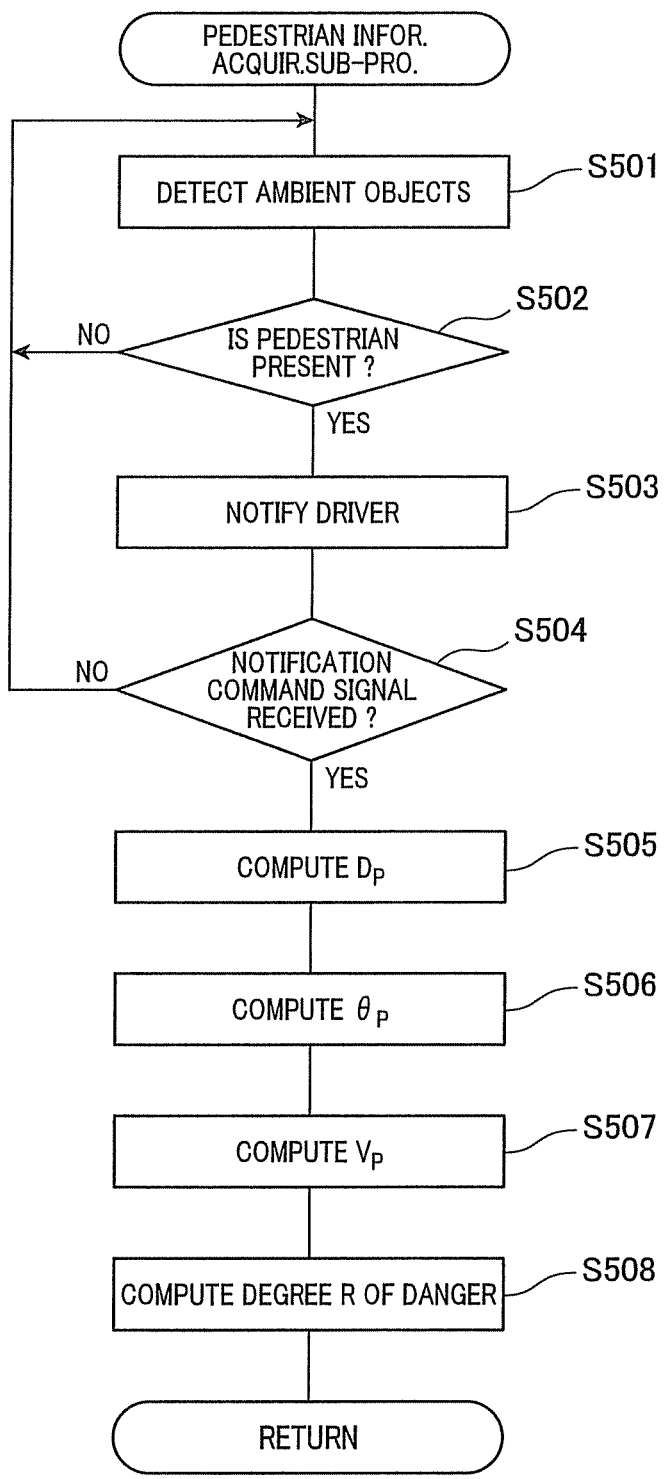
FIG. 14 is a flow chart illustrating a pedestrian information acquiring sub-process according to the third embodiment.

First, the pedestrian information acquiring sub-process will be described with reference to FIG. 14.

At step S501, the camera 300 detects ambient objects present around the vehicle V1. Then, the detection results are sent, via the operation part 310 of the ECU 31, to the pedestrian presence determining part 311 of the ECU 31.

At step S502, the pedestrian presence determining part 311 determines, based on the detection results of the camera 300, whether there is a pedestrian P present near the vehicle V1.

If the determination at step S502 produces a "No" answer, then the sub-process returns to step S501.

In contrast, if the determination at step S502 produces a "Yes" answer, then the sub-process proceeds to step S503.

At step S503, the driver notification device 32 notifies the driver of the vehicle V1 that there is the pedestrian P present near the vehicle V1.

When the driver is notified of the presence of the pedestrian P and wishes the pedestrian notification apparatus 3 to notify the pedestrian P of the presence of the vehicle V1 nearing the pedestrian P, the driver issues the notification command by performing the input operation on the notification command input device 33. Consequently, the notification command input device 33 is caused by the input operation to generate and output the notification command signal.

At step S504, a determination is made as to whether the notification command signal is received by the notification command receiving part 312 of the ECU 31.

If the determination at step S504 produces a "No" answer, then the sub-process returns to step S501.

In contrast, if the determination at step S504 produces a "Yes" answer, then the sub-process proceeds to step S505.

At step S505, the operation part 310 of the ECU 31 computes, based on the detection results of the millimeter-wave radar 301, the distance $D_P$ from the vehicle V1 to the pedestrian P.

Further, at step S506, the operation part 310 computes, based on the detection results of the millimeter-wave radar 301, the azimuth $\theta_P$ of the pedestrian P with respect to the vehicle V1.

Consequently, the position of the pedestrian P is ascertained which is represented by the above-computed distance $D_P$ and azimuth $\theta_P$.

Furthermore, at step S507, the operation part 310 computes, based on the detection results of the millimeter-wave radar 301, the moving speed $V_P$ of the pedestrian P.

Then, at step S508, the operation part 310 computes, based on the above-computed distance $D_P$, azimuth $\theta_P$ and moving speed $V_P$, a degree R of danger to the pedestrian P.

Here, the degree R of danger to the pedestrian P denotes the degree of danger of the situation in which the pedestrian P. is placed. In the present embodiment, the degree R of danger to the pedestrian P is evaluated based on the distance $D_P$ from the vehicle V1 to the pedestrian P, the azimuth $\theta_P$ of the pedestrian P with respect to the vehicle V1 and the moving speed $V_P$ of the pedestrian P. More specifically, when both the distance $D_P$ and the absolute value of the azimuth $\theta_P$ are small, the degree R of danger to the pedestrian P is evaluated (i.e., computed by the operation part 310) to be high. In contrast, the degree R of danger to the pedestrian P is evaluated to be low when both the distance $D_P$ and the absolute value of the azimuth $\theta_P$ are large and the absolute value of the moving speed $V_P$ is small or the moving direction of the pedestrian P is away from the vehicle V1 or from a point in front of the vehicle V1.

After step S508, the pedestrian information acquiring sub-process is terminated to return to the main process (i.e., the pedestrian notification process shown in FIG. 13).

Figure 15:
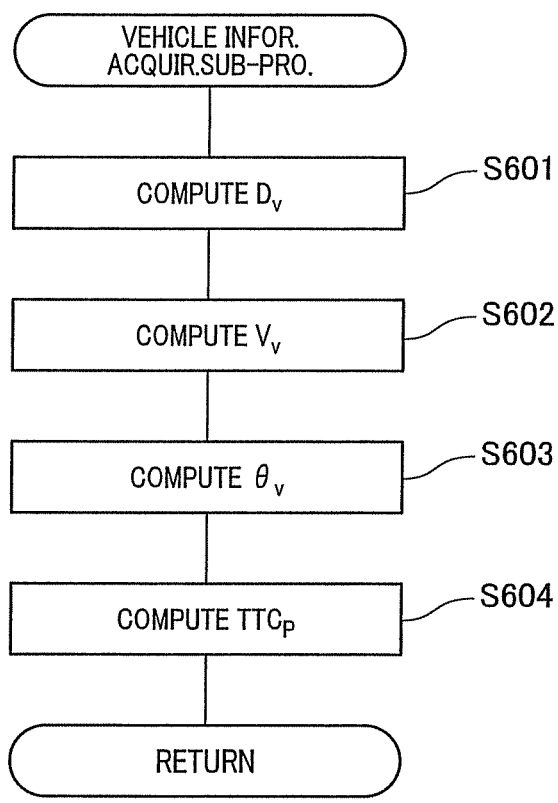
FIG. 15 is a flow chart illustrating a vehicle information acquiring sub-process according to the third embodiment.

Next, the vehicle information acquiring sub-process will be described with reference to FIG. 15.

At step S601, the operation part 310 of the ECU 31 computes, based on the detection results of the millimeter-wave radar 301, the inter-vehicle distance Dv between the vehicle V1 and a preceding vehicle running ahead of the vehicle V1.

At step S602, the operation part 310 computes, based on the detection results of the vehicle speed sensor 302, the running speed Vv of the vehicle V1.

At step S603, the operation part 310 computes, based on the detection results of the steering angle sensor 303, the steering angle $\theta_V$ of the vehicle V1.

At step S604, the operation part 310 computes, based on the distance Dp from the vehicle V1 to the pedestrian P, the moving speed Vp of the pedestrian P and the running speed Vv of the vehicle V1, a time allowance TTCp for avoiding a collision between the pedestrian P and the vehicle V1 by the following equation: TTCp=Dp/|Vv−Vp|.

After step S604, the vehicle information acquiring sub-process is terminated to return to the main process (i.e., the pedestrian notification process shown in FIG. 13).

Figure 16:
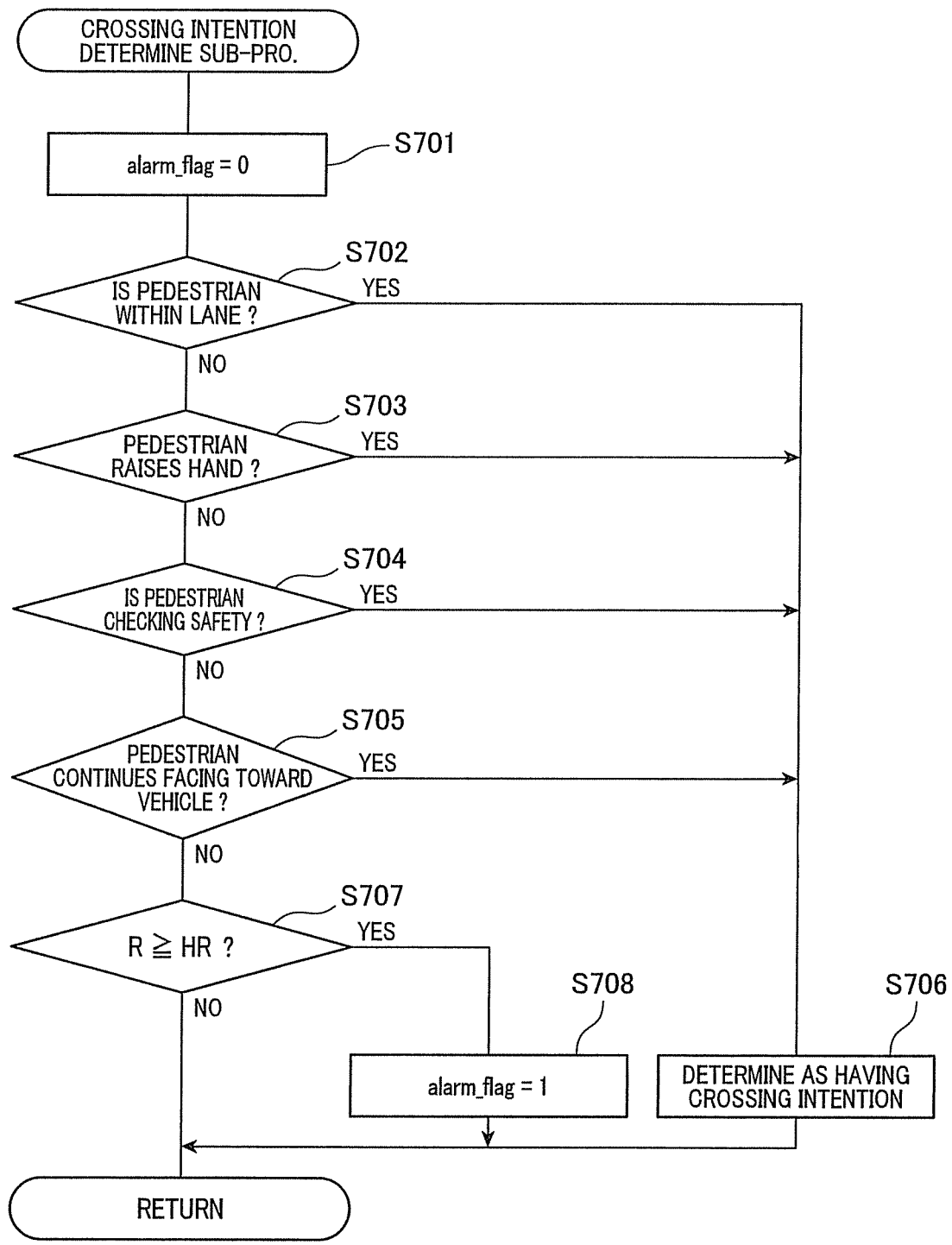
FIG. 16 is a flow chart illustrating a crossing intention determining sub-process according to the third embodiment.

Next, the crossing intention determining sub-process will be described with reference to FIG. 16.

In this sub-process, the crossing intention determining part 313 of the ECU 31 determines, based on the detection results of the camera 300, whether the pedestrian P has an intention of crossing the road on which the vehicle V1 is running.

Specifically, at step S701, an audible alarm output flag alarm_flag is cleared (i.e., set to 0) by the operation part 310 of the ECU 31.

At step S702, the crossing intention determining part 313 of the ECU 31 determines whether the pedestrian P is present within the width of the lane on which the vehicle V1 is running.

If the determination at step S702 produces a "Yes" answer, then the sub-process proceeds to step S706, at which the crossing intention determining part 313 determines that the pedestrian P has an intention of crossing the road. Thereafter, the sub-process is terminated to return to the main process (i.e., the pedestrian notification process shown in FIG. 13).

In contrast, if the determination at step S702 produces a "No" answer, then the sub-process proceeds to step S703.

At step S703, the crossing intention determining part 313 further determines whether the pedestrian P raises his (or her) hand to express his intention to cross the road.

If the determination at step S703 produces a "Yes" answer, then the sub-process proceeds to step S706, at which the crossing intention determining part 313 determines that the pedestrian P has an intention of crossing the road. Thereafter, the sub-process is terminated to return to the main process.

In contrast, if the determination at step S703 produces a "No" answer, then the sub-process proceeds to step S704.

At step S704, the crossing intention determining part 313 further determines whether the pedestrian P is checking safety by turning his face toward the vehicle V1, then away from the vehicle V1 and again toward the vehicle V1.

If the determination at step S704 produces a "Yes" answer, then the sub-process proceeds to step S706, at which the crossing intention determining part 313 determines that the pedestrian P has an intention of crossing the road. Thereafter, the sub-process is terminated to return to the main process.

In contrast, if the determination at step S704 produces a "No" answer, then the sub-process proceeds to step S705.

At step S705, the crossing intention determining part 313 further determines whether the pedestrian P continues facing toward the vehicle V1 for not less than a predetermined time.

If the determination at step S705 produces a "Yes" answer, then the sub-process proceeds to step S706, at which the crossing intention determining part 313 determines that the pedestrian P has an intention of crossing the road. Thereafter, the sub-process is terminated to return to the main process.

In contrast, if the determination at step S705 produces a "No" answer, then the sub-process proceeds to step S707.

At step S707, the operation part 310 of the ECU 31 determines whether the degree R of danger to the pedestrian P, which has been computed in the pedestrian information acquiring sub-process, is higher than or equal to the predetermined higher threshold HR.

If the determination at step S707 produces a "Yes" answer, then the sub-process proceeds to step S708, at which the audible alarm output flag alarm_flag is set to 1 by the operation part 310. Thereafter, the sub-process is terminated to return to the main process.

In contrast, if the determination at step S707 produces a "No" answer, then the sub-process is directly terminated to return to the main process (i.e., the pedestrian notification process shown in FIG. 13).

Figure 17:
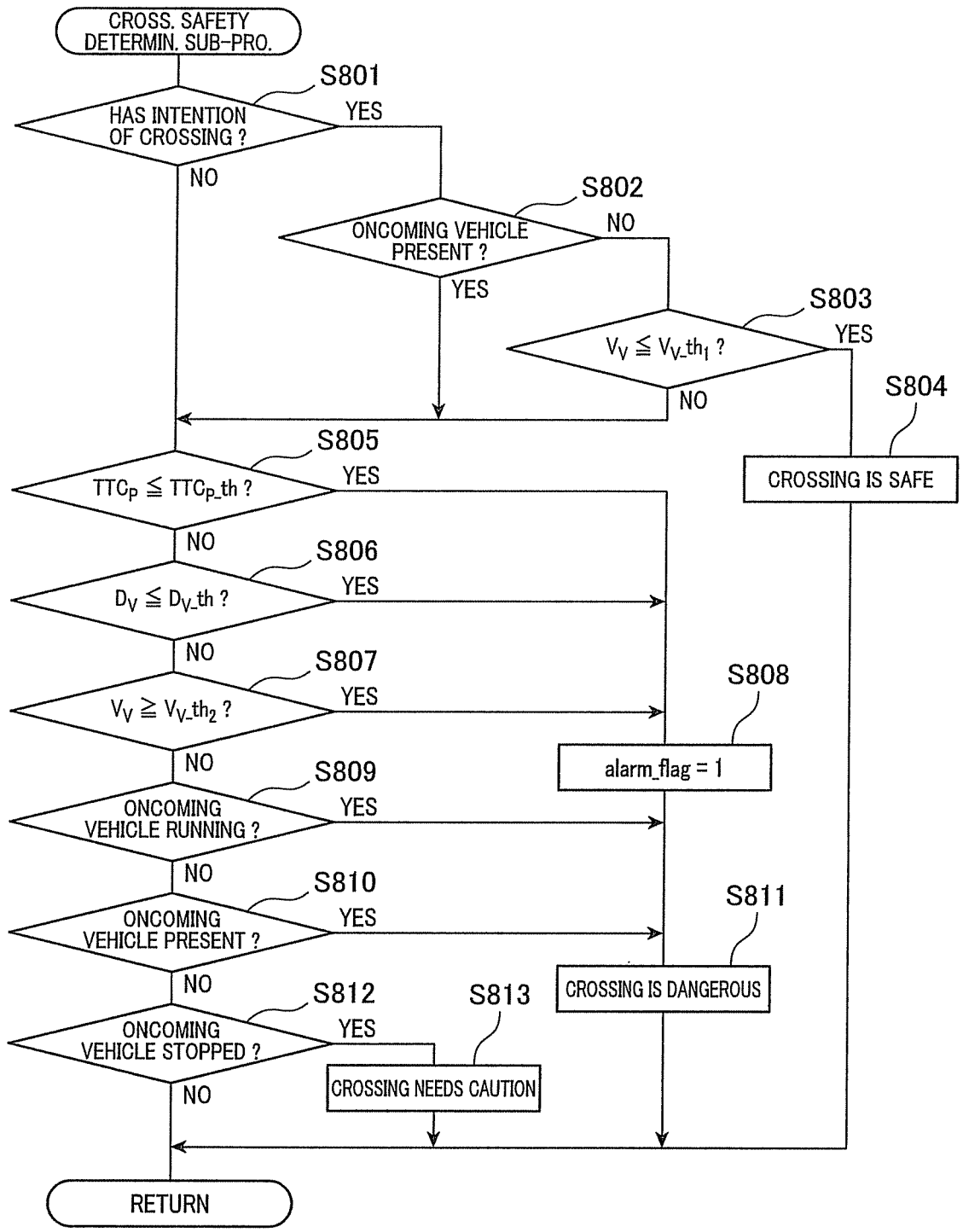
FIG. 17 is a flow chart illustrating a crossing safety determining sub-process according to the third embodiment.

Next, the crossing safety determining sub-process will be described with reference to FIG. 17.

In this sub-process, the crossing safety determining part 314 of the ECU 31 determines, based on the detection results of the camera 300, whether the crossing of the road intended by the pedestrian P is safe, dangerous, or needs caution.

Specifically, at step S801, the crossing safety determining part 314 checks whether the pedestrian P has been determined as having an intention of crossing the road in the crossing intention determining sub-process.

If the result of the check at step S801 is "Yes", then the sub-process proceeds to step S802. In contrast, if the result of the check at step S801 is "No", then the sub-process goes on to step S805.

At step S802, the crossing safety determining part 314 determines whether there is an oncoming vehicle.

If the determination at step S802 produces a "Yes" answer, then the sub-process proceeds to step S805. In contrast, if the determination at step S802 produces a "No" answer, then the sub-process goes on to step S803.

At step S803, the crossing safety determining part 314 further determines whether the running speed Vv of the vehicle V1 is lower than or equal to a predetermined first threshold $Vv\_th_1$.

If the determination at step S803 produces a "Yes" answer, then the sub-process proceeds to step S804, at which the crossing safety determining part 314 determines the crossing of the road intended by the pedestrian P as being safe. Thereafter, the sub-process is terminated to return to the main process (i.e., the pedestrian notification process shown in FIG. 13).

In contrast, if the determination at step S803 produces a "No" answer, then the sub-process goes on to step S805.

At step S805, the crossing safety determining part 314 determines whether the time allowance TTCp for avoiding a collision between the pedestrian P and the vehicle V1, which has been computed in the vehicle information acquiring sub-process, is shorter than or equal to a predetermined time allowance threshold TTCp_th.

If the determination at step S805 produces a "Yes" answer, then the sub-process proceeds to step S808. In contrast, if the determination at step S805 produces a "No" answer, then the sub-process goes on to step S806.

At step S806, the crossing safety determining part 314 further determines whether the inter-vehicle distance Dv between the vehicle V1 and the preceding vehicle, which has been computed in the vehicle information acquiring sub-process, is shorter than or equal to a predetermined inter-vehicle distance threshold Dv_th.

If the determination at step S806 produces a "Yes" answer, then the sub-process proceeds to step S808. In contrast, if the determination at step S806 produces a "No" answer, then the sub-process goes on to step S807.

At step S807, the crossing safety determining part 314 further determines whether the running speed Vv of the vehicle V1 is higher than or equal to a predetermined second threshold $Vv\_th_2$. Here, the second threshold $Vv\_th_2$ is higher than or equal to the first threshold $Vv\_th_1$ used at step S803.

If the determination at step S807 produces a "Yes" answer, then the sub-process proceeds to step S808.

At step S808, the audible alarm output flag alarm_flag is set to 1 by the operation part 310 of the ECU 31. Then, the sub-process goes on to step S811.

On the other hand, if the determination at step S807 produces a "No" answer, then the sub-process proceeds to step S809.

At step S809, the crossing safety determining part 314 determines whether there is an oncoming vehicle V2 which is in a running state.

If the determination at step S809 produces a "Yes" answer, then the sub-process proceeds to step S811. In contrast, if the determination at step S809 produces a "No" answer, then the sub-process goes on to step S810.

At step S810, the crossing safety determining part 314 further determines whether there is an overtaking vehicle V3 which is overtaking the vehicle V1.

If the determination at step S810 produces a "Yes" answer, then the sub-process proceeds to step S811.

At step S811, the crossing safety determining part 314 determines the crossing of the road intended by the pedestrian P as being dangerous. Thereafter, the sub-process is terminated to return to the main process (i.e., the pedestrian notification process shown in FIG. 13).

Otherwise, if the determination at step S810 produces a "No" answer, then the sub-process proceeds to step S812.

At step S812, the crossing safety determining part 314 determines whether there is an oncoming vehicle V4 which is in a stopped state.

If the determination at step S812 produces a "Yes" answer, then the sub-process proceeds to step S813, at which the crossing safety determining part 314 determines the crossing of the road intended by the pedestrian P as needing caution. Thereafter, the sub-process is terminated to return to the main process (i.e., the pedestrian notification process shown in FIG. 13).

In contrast, if the determination at step S812 produces a "No" answer, then the sub-process is directly terminated to return to the main process.

Next, the notification function setting sub-process will be described with reference to FIG. 18.

In this sub-process, the setting part 315 of the ECU 31 sets the pedestrian notification function of the notification function performing unit 34 based on the results of the crossing safety determining sub-process described above.

Specifically, at step S901, the setting part 315 clears existing data for the irradiation of the predetermined pattern by the DMD 340 and the output of the audible alarm by the speaker 341.

At step S902, the setting part 315 checks whether the crossing of the road intended by the pedestrian P has been determined as being safe in the crossing safety determining sub-process.

If the result of the check at step S902 is "Yes", then the sub-process proceeds to step S903.

At step S903, the setting part 315 sets the predetermined pattern, which is to be irradiated by the DMD 340, to a first pattern as shown in FIG. 19A. The first pattern indicates that the crossing of the road intended by the pedestrian P is safe. Thereafter, the sub-process is terminated to return to the main process (i.e., the pedestrian notification process shown in FIG. 13).

On the other hand, if the result of the check at step S902 is "No", then the sub-process proceeds to step S904.

At step S904, the setting part 315 further checks whether the crossing of the road intended by the pedestrian P has been determined as being dangerous in the crossing safety determining sub-process.

If the result of the check at step S904 is "Yes", then the sub-process proceeds to step S905.

At step S905, the setting part 315 further checks whether the audible alarm output flag alarm_flag has been set to 1.

If the result of the check at step S905 is "Yes", then the sub-process proceeds to step S906, at which the setting part 315 sets an audible alarm output function (abbreviated to A. A. O. F.) of the notification function performing unit 34. Thereafter, the sub-process is terminated to return to the main process.

Otherwise, if the result of the check at step S905 is "No", then the sub-process proceeds to step S907, at which the setting part 315 sets the predetermined pattern to a second pattern as shown in FIG. 19B. The second pattern indicates that the crossing of the road intended by the pedestrian P is dangerous. Thereafter, the sub-process is terminated to return to the main process.

On the other hand, if the result of the check at step S904 is "No", then the sub-process proceeds to step S908.

At step S908, the setting part 315 further checks whether the crossing of the road intended by the pedestrian P has been determined as needing caution in the crossing safety determining sub-process.

If the result of the check at step S908 is "Yes", then the sub-process proceeds to step S909, at which the setting part 315 sets the predetermined pattern to a third pattern as shown in FIG. 19C. The third pattern indicates that the crossing of the road intended by the pedestrian P needs caution. Thereafter, the sub-process is terminated to return to the main process.

Otherwise, if the result of the check at step S908 is "No", then the sub-process proceeds to step S910.

At step S910, the setting part 315 further checks whether the audible alarm output flag alarm_flag has been set to 1.

If the result of the check at step S910 is "Yes", then the sub-process proceeds to step S911, at which the setting part 315 sets the audible alarm output function of the notification function performing unit 34. Thereafter, the sub-process is terminated to return to the main process.

Otherwise, if the result of the check at step S910 is "No", then the sub-process is directly terminated to return to the main process (i.e., the pedestrian notification process shown in FIG. 13).

In addition, it should be noted that though the first, second and third patterns are respectively configured to be the patterns of a crosswalk, a "STOP!" sign and a "CAUTION" sign in the present embodiment, they may also be configured to be other patterns which are clearly indicative of the safety of the crossing of the road intended by the pedestrian P.

Figure 20:
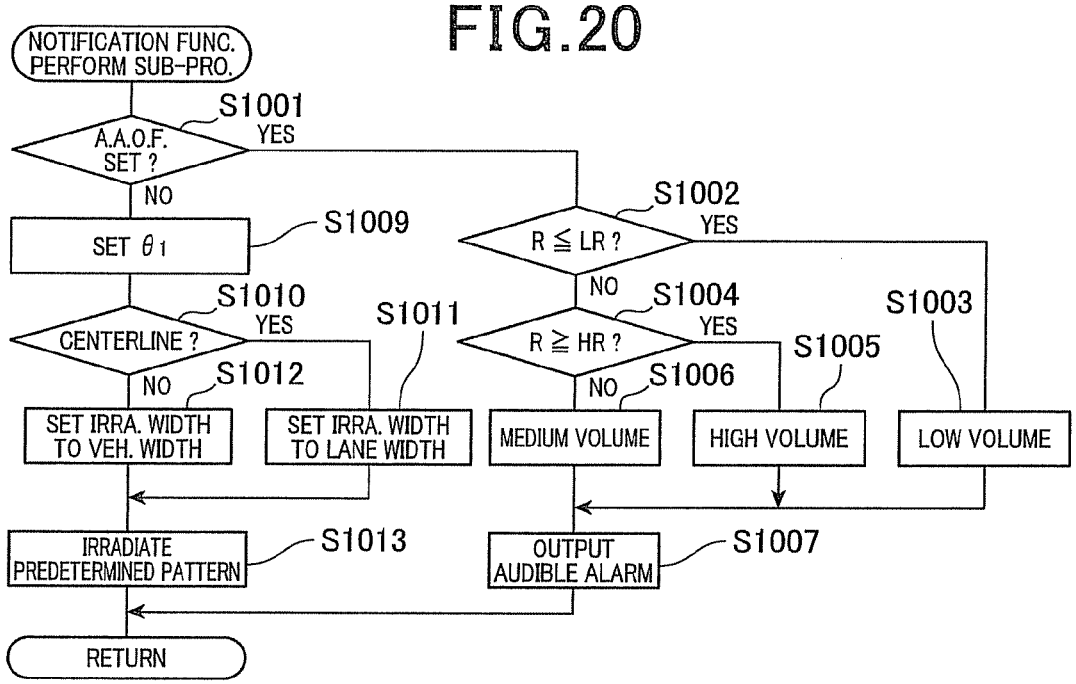
FIG. 20 is a flow chart illustrating a notification function performing sub-process according to the third embodiment.

Next, the notification function performing sub-process will be described with reference to FIG. 20.

In this sub-process, the notification function performing unit 34 performs, under the control of the notification function controlling part 316 of the ECU 31, the pedestrian notification function set in the notification function setting sub-process as described above.

Specifically, at step S1001, the operation part 310 of the ECU 31 checks whether the audible alarm output function (abbreviated to A. A. O. F. in FIG. 20) has been set in the notification function setting sub-process.

If the result of the check at step S1001 is "Yes", then the sub-process proceeds to step S1002.

At step S1002, the operation part 310 further checks whether the degree R of danger to the pedestrian P computed in the pedestrian information acquiring sub-process is lower than or equal to the predetermined lower threshold LR.

If the result of the check at step S1002 is "Yes", then the sub-process proceeds to step S1003, at which the setting part 315 of the ECU 31 sets the volume of the audible alarm to a low level. Thereafter, the sub-process goes on to step S1007.

In contrast, if the result of the check at step S1002 is "No", then the sub-process proceeds to step S1004.

At step S1004, the operation part 310 further checks whether the degree R of danger to the pedestrian P is higher than or equal to the predetermined higher threshold HR.

If the result of the check at step S1004 is "Yes", then the sub-process proceeds to step S1005, at which the setting part 315 sets the volume of the audible alarm to a high level. Thereafter, the sub-process goes on to step S1007.

Otherwise, if the result of the check at step S1004 is "No", then the sub-process proceeds to step S1006, at which the setting part 315 sets the volume of the audible alarm to a medium level. Thereafter, the sub-process goes on to step S1007.

At step S1007, the notification function controlling part 316 of the ECU 31 controls the speaker 341 of the notification function performing unit 34 to output the audible alarm at the volume set at either of steps S1003, S1005 and S1006 toward the azimuth $\theta_p$ of the pedestrian P computed in the pedestrian information acquiring sub-process. Thereafter, the sub-process is terminated to return to the main process (i.e., the pedestrian notification process shown in FIG. 13), and then the main process goes to the end.

On the other hand, if the result of the check at step S1001 is "No", then the sub-process proceeds to step S1009.

At step S1009, the setting part 315 of the ECU 31 sets an inclination angle $\theta_I$ for irradiation of the predetermined pattern based on the steering angle $\theta_V$ of the vehicle V1 computed in the vehicle information acquiring sub-process.

Figure 21:
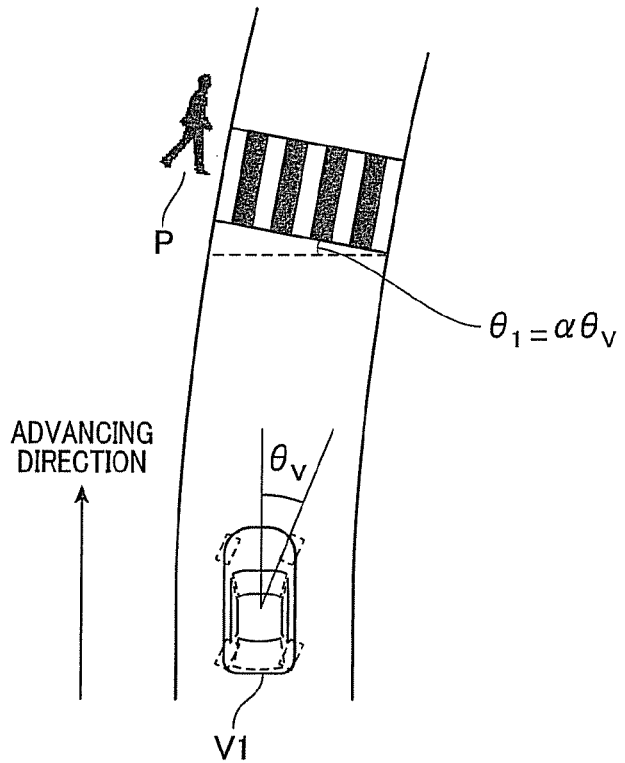
FIG. 21 is a schematic view illustrating the manner of setting an inclination angle for irradiation of a pattern based on the steering angle of the vehicle according to the third embodiment.
Figure 22A:
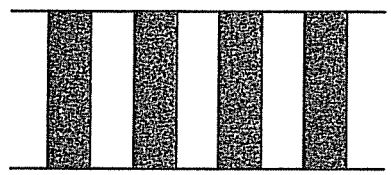
FIGS. 22A, 22B and 22C are schematic views respectively illustrating three examples of the inclination angle.
Figure 22B:
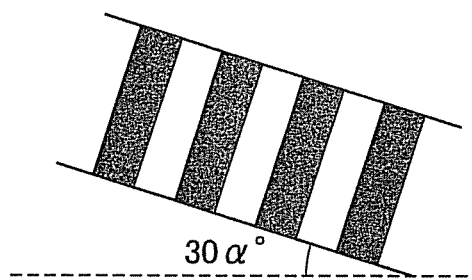
Figure 22C:
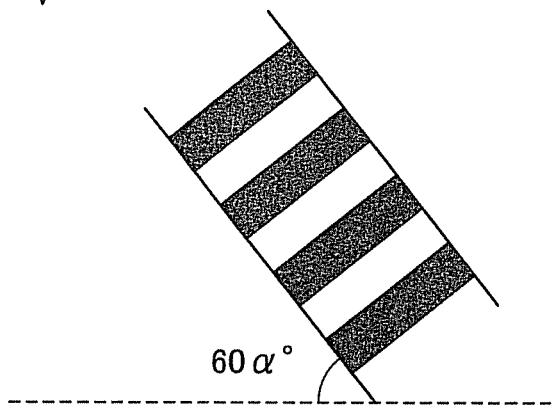

Specifically, referring to FIG. 21, when the road is curved and thus the vehicle V1 runs at the steering angle $\theta_V$ that is proportional to the angle of the road curve, the inclination angle $\theta_I$ is set to $\alpha\theta_V$, where $\alpha$ is a predetermined coefficient (e.g., 1). In addition, FIGS. 22A-22C respectively illustrate three examples of the inclination angle $\theta_h$ where the values of the steering angle $\theta_V$ of the vehicle V1 are respectively equal to 0°, 30° and 60°.

Referring back to FIG. 20, at succeeding step S1010, the operation part 310 of the ECU 31 determines, based on the detection results of the camera 300, whether there is a centerline drawn on the road.

Figure 23A:
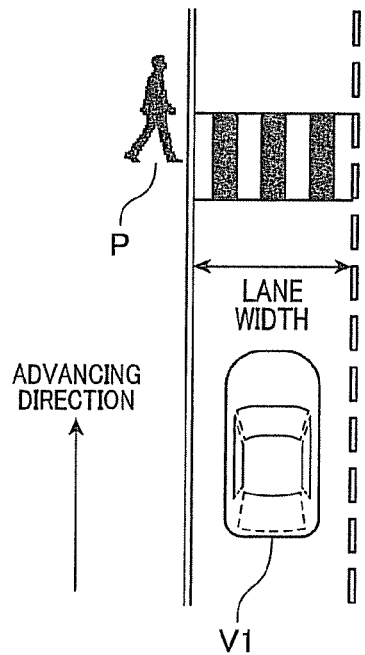
FIGS. 23A and 23B are schematic views respectively illustrating two examples of setting the irradiation width of a pattern according to the third embodiment.

If the determination at step S1010 produces a "Yes" answer, then the sub-process proceeds to step S1011, at which the setting unit 315 of the ECU 31 sets the irradiation width of the predetermined pattern, which is to be irradiated by the DMD 340, based on the width of the lane on which the vehicle V1 is running. More particularly, in the present embodiment, as shown in FIG. 23A, the maximum irradiation width of the predetermined pattern (e.g., the first pattern) is set to be equal to the width of the lane. Thereafter, the sub-process goes on to step S1013.

Figure 23B:
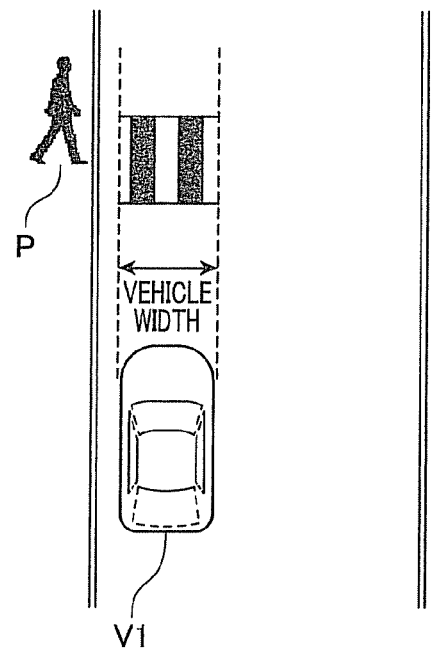

In contrast, if the determination at step S1010 produces a "No" answer, then the sub-process proceeds to step S1012, at which the setting unit 315 sets the irradiation width of the predetermined pattern based on the width of the vehicle V1. More particularly, in the present embodiment, as shown in FIG. 23B, the maximum irradiation width of the predetermined pattern is set to be equal to the width of the vehicle V1. Thereafter, the sub-process goes on to step S1013.

In addition, it should be noted that when there is no centerline drawn on the road, it is also possible to set the irradiation width of the predetermined pattern based on the width of the vehicle V1.

At step S1013, the notification function controlling part 316 of the ECU 31 controls the DMD 340 of the notification function performing unit 34 to irradiate the predetermined pattern set in the notification function setting sub-process by taking the position of the pedestrian P as a target irradiation position. In addition, the position of the pedestrian P is represented by the distance $D_P$ from the vehicle V1 to the pedestrian P and the azimuth $\theta_P$ of the pedestrian P, both of which have been already computed in the pedestrian information acquiring sub-process.

Figure 24A:
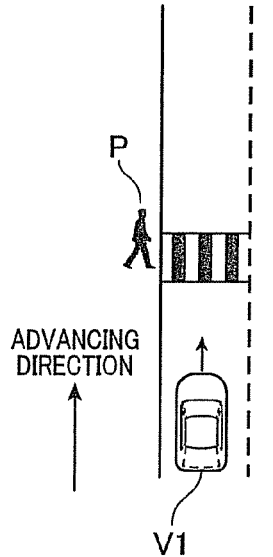
FIGS. 24A, 24B and 24C are schematic views respectively illustrating the first, second and third patterns irradiated onto the road surface.
Figure 24B:
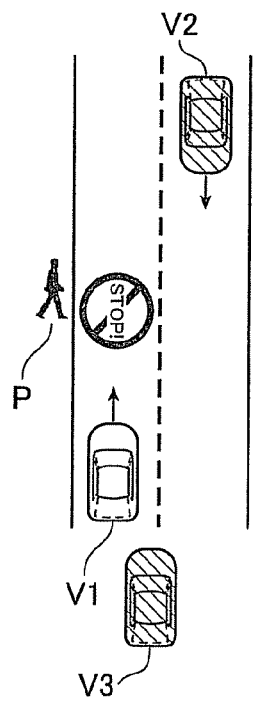
Figure 24C:
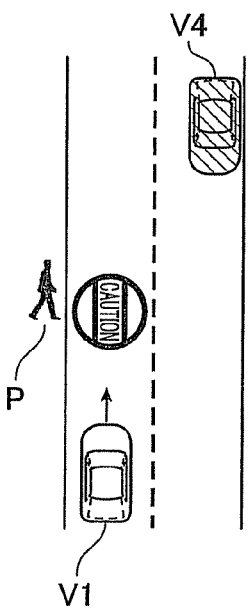
Figure 25:
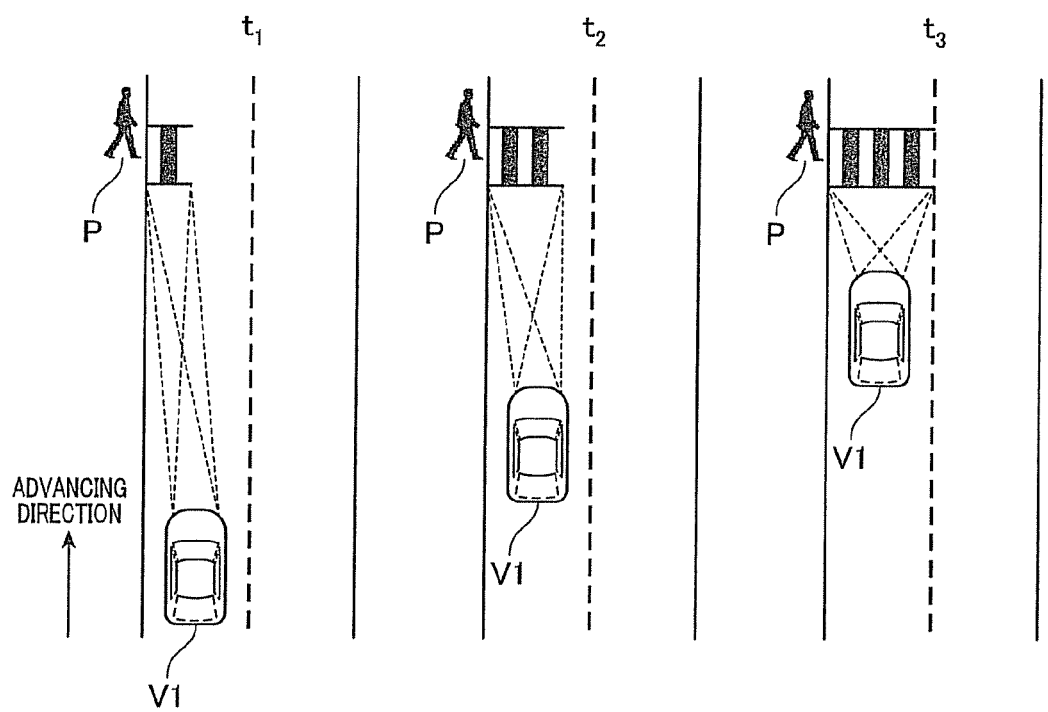
FIG. 25 is a schematic view illustrating the manner of irradiating the first pattern according to the third embodiment.

For example, in a case where the running speed Vv of the vehicle V1 is lower than or equal to the predetermined first threshold $Vv\_th_1$ and there is no oncoming vehicle, as shown in FIG. 24A, the DMD 340 irradiates the first pattern indicating that the crossing of the road intended by the pedestrian P is safe. In another case where there are both an oncoming vehicle V2 which is in a running state and an overtaking vehicle V3 which is overtaking the vehicle V1, as shown in FIG. 24B, the DMD 340 irradiates the second pattern indicating that the crossing of the road intended by the pedestrian P is dangerous. In yet another case where there is an oncoming vehicle V4 which is in a stopped state, as shown in FIG. 24C, the DMD 340 irradiates the third pattern indicating that the crossing of the road intended by the pedestrian P needs caution. Further, in any of the three cases shown in FIGS. 24A-24C, the DMD 340 irradiates the pattern so that the pattern is displayed in front of the pedestrian P and oriented to the pedestrian P. Moreover, in the first case, as shown in FIG. 25, the DMD 340 irradiates the first pattern so that: the first pattern is gradually displayed (i.e., the width of the first pattern is gradually increased with time) on the road surface from the feet of the pedestrian P in the predicted advancing direction of the pedestrian P; and the relative position of the first pattern to the pedestrian P is unchanged regardless of the decrease in the distance $D_P$ from the vehicle V1 to the pedestrian P as the vehicle V1 approaches the pedestrian P. In addition, in any of the three cases, the pattern may be irradiated either in a single color or in a plurality of colors.

After step S1013, the notification function performing subprocess is terminated to return to the main process (i.e., the pedestrian notification process show in FIG. 13), and then the main process goes to the end.

According to the present embodiment, it is possible to achieve the following advantageous effects.

In the present embodiment, the pedestrian notification apparatus 3 sets the predetermined pattern based on whether the pedestrian P has an intention of crossing the road as well as on the ambient environment of the vehicle V1; then, the apparatus 3 irradiates the predetermined pattern to the pedestrian P. Further, the pedestrian notification apparatus 3 sets the volume of the audible alarm according to the degree R of danger to the pedestrian P and outputs the audible alarm at the set volume. Consequently, with the predetermined pattern and audible alarm, it is possible for the pedestrian notification apparatus 3 to notify the pedestrian P that the vehicle V1 (more precisely the apparatus 3 provided on the vehicle V1) has recognized the presence of the pedestrian P. Moreover, by setting the predetermined pattern and the volume of the audible alarm, it is also possible for the pedestrian notification apparatus 3 to provide the pedestrian P with additional information, such as information on whether the crossing of the road intended by the pedestrian P is safe, dangerous or needs caution and information on the degree of danger of the situation in which the pedestrian P is placed. As a result, with the additional information, it is possible for the pedestrian notification apparatus 3 to lead the pedestrian P. In addition, by setting the volume of the audible alarm according to the degree R of danger to the pedestrian P, it is possible to allow the pedestrian P to perceive the degree R of danger via his acoustic sense. Consequently, it is possible to easily and effectively alert the pedestrian P.

While the above particular embodiments have been shown and described, it will be understood by those skilled in the art that various modifications, changes, and improvements may be made without departing from the spirit of the present invention.

For example, in the third embodiment, the volume of the audible alarm is set according to the degree R of danger to the pedestrian P. However, instead of the volume of the audible alarm, it is also possible to set the pitch or the type of the audible alarm according to the degree R of danger to the pedestrian P.

Specifically, the pitch of the audible alarm may be set so as to be low when the degree R of danger is lower than or equal to the predetermined lower threshold LR and high when the degree R of danger is higher than or equal to the predetermined higher threshold HR.

In the first to the third embodiments, the distance from the vehicle V1 to the pedestrian P, the azimuth of the pedestrian P with respect to the vehicle V1 and the moving speed of the pedestrian P are detected by the millimeter-wave radars 101, 201 and 301.

However, those parameters may also be detected by the cameras 100, 200 and 300 instead. In this case, it is possible to omit the millimeter-wave radars 101, 201 and 301, thereby simplifying the configurations of the pedestrian notification apparatuses 1, 2 and 3.

Further, it is also possible to detect the above parameters by other detecting means than the millimeter-wave radars and the cameras, for example by laser radars or ultrasonic sensors.

Furthermore, it is also possible to acquire information about the above parameters from devices or equipment provided outside of the vehicle V1, for example infrastructure equipment provided on the roadside or at a traffic signal.

In the first and second embodiments, the notification function performing units 12 and 22 include no speaker for outputting an audible alarm. However, the notification function performing units 12 and 22 may also be modified to further include a speaker as described in the third embodiment.

In addition, the speaker may be configured to output the audible alarm when the pedestrian P is determined by the pedestrian presence determining part (or notification target detector) as failing to face toward the vehicle for not less than a predetermined time.

What is claimed is:

1. A pedestrian notification apparatus which is configured to be used in a vehicle, the apparatus comprising:
   an ambient object detector configured to detect ambient objects present around the vehicle;
   a notification target detector configured to detect a notification target pedestrian based on the detection results of the ambient object detector;
   a notifier configured to notify the notification target pedestrian that the notification target pedestrian has been detected by the notification target detector;
   a position detector that is configured to detect a position of the notification target pedestrian, and
   a speed detector that is configured to detect a moving speed of the notification target pedestrian, wherein
   the notifier comprises a marking light irradiator that irradiates, based on the position of the notification target pedestrian detected by the position detector, a predetermined marking light onto a road surface, the marking light being indicative of information to be communicated to the notification target pedestrian; and
   the marking light irradiator is configured to irradiate the marking light with the color of the marking light being changed according to both the position of the notification target pedestrian detected by the position detector and the moving speed of the notification target pedestrian detected by the speed detector.

2. A pedestrian notification apparatus which is configured to be used in a vehicle, the apparatus comprising:
   an ambient object detector configured to detect ambient objects present around the vehicle;
   a notification target detector configured to detect a notification target pedestrian based on the detection results of the ambient object detector;
   a notifier configured to notify the notification target pedestrian that the notification target pedestrian has been detected by the notification target detector; and
   a position detector that is configured to detect a position of the notification target pedestrian; wherein the notifier comprises a pattern irradiator that irradiates, based on the position of the notification target pedestrian detected by the position detector, a predetermined pattern onto a road surface, the predetermined pattern being indicative of information to be communicated to the notification target pedestrian; and the pattern irradiator is configured to selectively irradiate one of first, second and third patterns as the predetermined pattern, the first pattern being indicative of that a crossing of a road intended by the notification target pedestrian is safe, the second pattern being indicative of that the crossing of the road intended by the notification target pedestrian is dangerous, the third pattern being indicative of that the crossing of the road intended by the notification target pedestrian needs caution.

3. The pedestrian notification apparatus as set forth in claim 2, wherein the first pattern is the pattern of a crosswalk.

4. A pedestrian notification apparatus which is configured to be used in a vehicle, the apparatus comprising:

an ambient object detector configured to detect ambient objects present around the vehicle;

a notification target detector configured to detect a notification target pedestrian based on the detection results of the ambient object detector;

a notifier configured to notify the notification target pedestrian that the notification target pedestrian has been detected by the notification target detector;

a position detector that is configured to detect a position of the notification target pedestrian;

a crossing intention determiner that is configured to determine whether the notification target pedestrian has an intention of crossing a road; and a crossing safety determiner that is configured to determine, when the notification target pedestrian is determined by the crossing intention determiner as having an intention of crossing the road, safety of the crossing of the road intended by the notification target pedestrian; wherein the notifier comprises a pattern irradiator that irradiates, based on the position of the notification target pedestrian detected by the position detector, a predetermined pattern onto a road surface, the predetermined pattern being indicative of information to be communicated to the notification target pedestrian; and when the crossing of the road intended by the notification target pedestrian is determined by the crossing safety determiner as being safe, the pattern irradiator irradiates a first pattern being indicative of that the crossing of the road is safe.

5. A pedestrian notification apparatus which is configured to be used in a vehicle, the apparatus comprising:

an ambient object detector configured to detect ambient objects present around the vehicle;

a notification target detector configured to detect a notification target pedestrian based on the detection results of the ambient object detector;

a notifier configured to notify the notification target pedestrian that the notification target pedestrian has been detected by the notification target detector;

a position detector that is configured to detect a position of the notification target pedestrian; wherein a speed detector that is configured to detect a moving speed of the notification target pedestrian, the notifier comprises an audible alarm outputter that is configured to output an audible alarm to an outside of the vehicle; and the audible alarm outputter is configured to output the audible alarm with at least one of the volume, pitch and type of the audible alarm being changed according to both the position of the notification target pedestrian detected by the position detector and the moving speed of the notification target pedestrian detected by the speed detector.

6. A pedestrian notification apparatus which is configured to be used in a vehicle, the apparatus comprising:

an ambient object detector configured to detect ambient objects present around the vehicle;

a notification target detector configured to detect a notification target pedestrian based on the detection results of the ambient object detector;

a notifier configured to notify the notification target pedestrian that the notification target pedestrian has been detected by the notification target detector;

the notifier comprises an audible alarm outputter that is configured to output an audible alarm to an outside of the vehicle; and the audible alarm outputter is configured to output the audible alarm when the notification target pedestrian is detected by the notification target detector as failing to face toward the vehicle for not less than a predetermined time.

* * * * *